(12) United States Patent
Hirata

(10) Patent No.: US 7,690,465 B2
(45) Date of Patent: Apr. 6, 2010

(54) VEHICLE HOOD STRUCTURE

(75) Inventor: Yorimitsu Hirata, Fuchu-cho (JP)

(73) Assignee: Mazda Motor Corporation (JP)

( * ) Notice: Subject to any disclaimer, the term of this patent is extended or adjusted under 35 U.S.C. 154(b) by 747 days.

(21) Appl. No.: 11/511,257

(22) Filed: Aug. 29, 2006

(65) Prior Publication Data

US 2007/0074919 A1   Apr. 5, 2007

(30) Foreign Application Priority Data

| Aug. 30, 2005 | (JP) | ............................ | 2005-249175 |
| Aug. 30, 2005 | (JP) | ............................ | 2005-249176 |
| Aug. 30, 2005 | (JP) | ............................ | 2005-249177 |
| Aug. 30, 2005 | (JP) | ............................ | 2005-249178 |

(51) Int. Cl.
   *B62D 25/10* (2006.01)
(52) U.S. Cl. .................................. 180/69.21; 180/69.2
(58) Field of Classification Search .............. 280/69.21, 280/69.2, 54.1
   See application file for complete search history.

(56) References Cited

FOREIGN PATENT DOCUMENTS

| DE | 103 43 077 | 4/2005 |
| EP | 1078826 A1 | 2/2001 |
| EP | 1 216 171 | 8/2003 |
| JP | 59 026370 | 2/1984 |
| JP | 5-44765/1993 | 6/1993 |
| JP | 11 099966 | 4/1999 |
| JP | 2005001493 | 1/2005 |
| JP | 2005-059799 | 3/2005 |
| JP | 2005059799 | 4/2005 |

OTHER PUBLICATIONS

European Search Report Application No. EP 06 017 293.9 dated Feb. 20, 2008.

*Primary Examiner*—Jeffrey J Restifo
(74) *Attorney, Agent, or Firm*—Studebaker & Brackett PC; Donald R. Studebaker

(57) ABSTRACT

Disclosed is a vehicle hood structure disposed in a front region of a vehicle body and supported in an openable and closable manner, which comprises a link member swingably supported in a pivoted manner by a pivot member located on the vehicle body, and a restriction mechanism adapted to couple the link member to a rear end of a hood so as to restrict the link member from being separated away from the hood. The restriction mechanism includes a restricting element located in either one of the link member and the hood, and a restricted element located in the remaining one of the link member and the hood. The vehicle hood structure of the present invention makes it possible to release a coupled state between the link member and the hood according to need, and, facilitate an operation of re-coupling the link member and the hood.

15 Claims, 22 Drawing Sheets

VEHICLE HOOD STRUCTURE

BACKGROUND OF THE INVENTION

1. Field of the Invention

The present invention relates to a vehicle hood structure disposed in a front region of a vehicle body and supported by the vehicle body in an openable and closable manner.

2. Description of the Related Art

Heretofore, there has been known a vehicle hood structure for a hood disposed in a front region of a vehicle body and a stationary portion of the vehicle body, as disclosed in Japanese Patent Laid-Open Publication No. 2005-059799. The vehicle hood structure comprises a link member, a first stopper portion, a second stopper portion, and lifting means. The link member is vertically swingably supported in a pivoted manner by a first lateral shaft provided in the stationary portion of the vehicle body, and disposed to extend frontward. The link member has a front end which is connected to and swingably supported in a pivoted manner by a second lateral shaft located on a bottom surface of a rear end of the hood. The first stopper portion is adapted to stop a swing movement of the link member about the second lateral shaft and in a direction toward the bottom surface of the rear end of the hood. The second stopper portion is adapted to stop a swing movement of the link member about the second lateral shaft and in a direction away from to the bottom surface of the rear end of the hood. The link member is designed to be selectively opened and closed about the first lateral shaft. The lifting means is operable, in response to a collision between the vehicle and an obstacle, to forcibly lift the rear end of the hood while breaking the second stopper portion. The second stopper portion is designed to have a strength less than that of the first stopper portion.

In the vehicle hood structure disclosed in the above patent publication, during an operation for opening or closing the hood, the link member and the hood are integrally coupled to each other through the second stopper portion, such as a connection member, and the hood is swingingly displaced about the second lateral shaft in a pivoted manner. Thus, the hood can be smoothly opened or closed, and can be stably kept in its full closed position. Further, in the event that the vehicle during running collides with an obstacle, the second stopper portion, such as the connection member, is broken according to a biasing force of the lifting means to permit the link member to be swingingly displaced upward about the first lateral shaft in a pivoted manner. Further, along with a swing movement of the link member about the second lateral shaft, the link member is displaced away from the bottom surface of the rear end of the hood, and the hood is forcibly lifted. Thus, this vehicle hood structure has the advantage that, an amount of downward displacement of the hood required when an obstacle hits against a top surface of the hood can be sufficiently ensured to effectively absorb a shock.

As above, in the event of a collision between the vehicle and an obstacle, the second stopper portion, such as the connection member, is broken according to a biasing force of the lifting means, and the connection member for integrally coupling the link member to the hood is dropped off. Thus, unless the link member and the hood is integrally coupled to each other using a new connection member when the hood is moved downward to run the vehicle again after action of the lifting means, the rear end of the hood will be inevitably moved up and down due to vibration during running of the vehicle, to cause a problem about occurrence of abnormal noise.

SUMMARY OF THE INVENTION

It is an object of the present invention to provide a vehicle hood structure which can be free from the above problem.

According to an aspect of the invention, a vehicle hood structure comprises a link member swingably supported in a pivoted manner by a pivot member located on a vehicle body, and a restriction mechanism adapted to couple the link member to a rear end of a hood so as to restrict the link member from being separated away from the hood. This restriction mechanism includes a press-fittable member located in either one of the link member and the hood, and a press-fittable-member receiving section located in the remaining one of the link member and the hood. The press-fittable member has a fixable portion adapted to be detachably fitted in the press-fittable-member receiving section while being displaced and deformably reduced in diameter.

These and other objects, features, aspects, and advantages of the present invention will become more apparent from the following detailed description of the preferred embodiments and examples with reference to the accompanying drawings.

DETAILED DESCRIPTION OF THE PREFERRED EMBODIMENTS OF THE INVENTION

Figure 1:
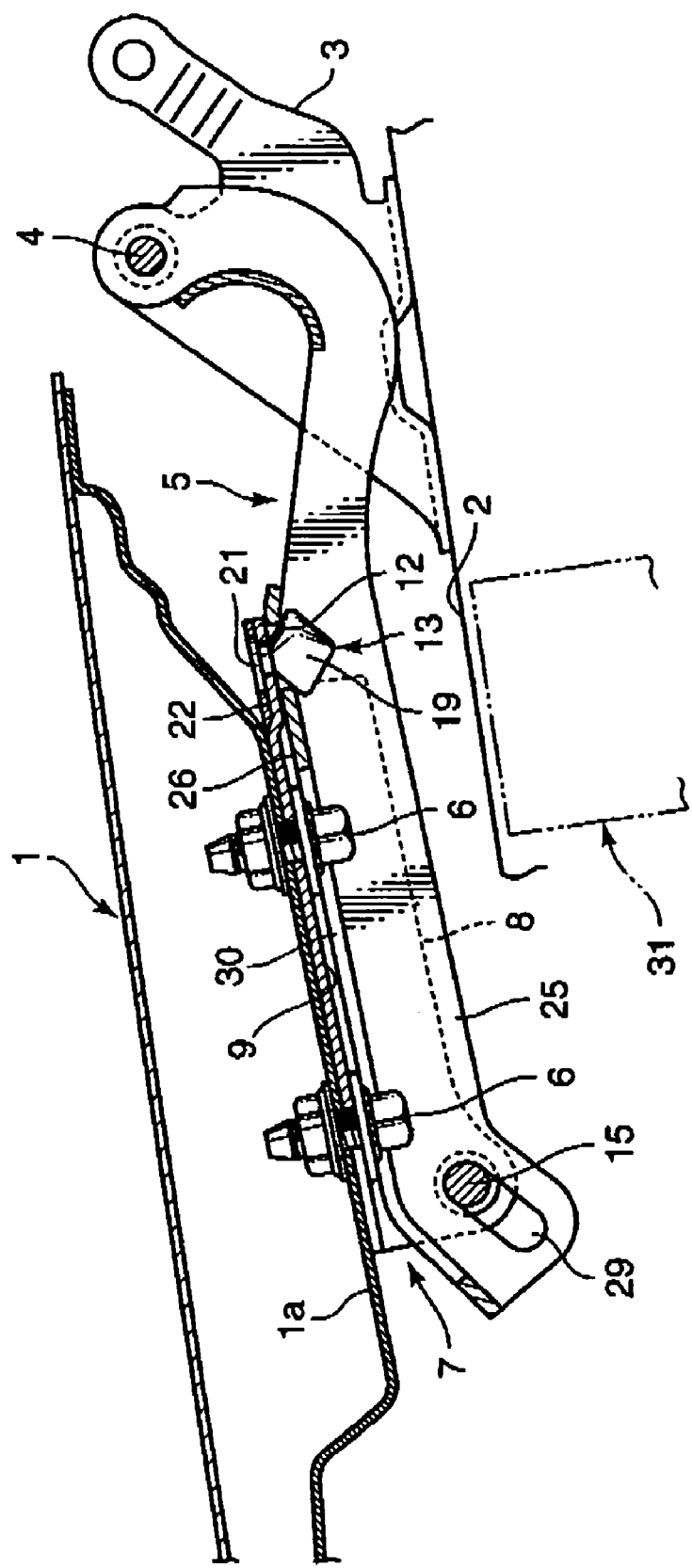
FIG. 1 is a sectional side view showing a vehicle hood structure according to a first embodiment of the present invention.

FIGS. 1 to 4 show a vehicle hood structure according to a first embodiment of the present invention. This vehicle hood structure comprises a hood 1 disposed to cover over an upper surface of an engine compartment and supported by a vehicle body in an openable and closable manner, a hinge bracket 3 located in the vehicle body and fixed to the vehicle body, such as a top surface of a front fender, with bolts or the like, a link member having an anchor end which is pivotally supported by a first pivot member 4 composed, for example, of a hinge pin located on the hinge bracket 3, and a hood-side bracket 7 fixed to the hood 1, specifically, onto a bottom surface of a rear end of a hood inner panel 1a, with a pair of front and rear mounting bolts 6. The link member 5 has a tip or front end pivotally supported by the hood-side bracket 7.

The hood-side bracket 7 is formed in a sectionally angular C shape which has a pair of right and left side walls 8 and a mounting base wall 9 connecting respective upper edges of the side walls 8 together. The mounting base wall 9 is formed with a notched groove 10 and a through-hole 11 each serving as an insertion portion for the mounting bolts 6. Further, a press-fittable member 13 adapted to be press-fitted into a press-fittable-member receiving section 12 (hereinafter referred to as "receiving member 12") consisting of a through-hole formed in the link member 5 is attached to a convex portion 14 of the mounting base wall 9 formed on the side of a rear end of the vehicle body. Each of the side walls 8 of the hood-side bracket 7 has a front end which is formed with a through-hole 16 for a second pivot member 15 composed, for example, of a coupling pin for pivotally supporting the front end of the link member 5, and a rearward (relative to the vehicle body) region formed as a spread portion 17 having a lower edge spread outward.

Figure 6:
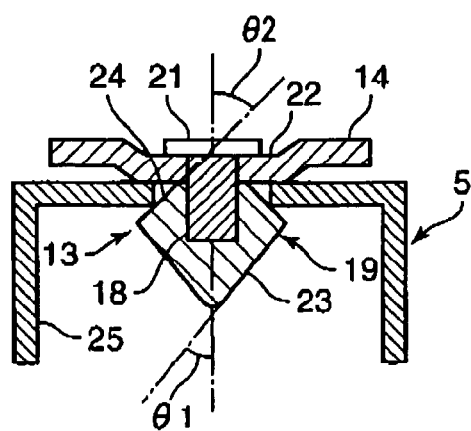
FIG. 6 is a sectional view taken along the line VI-VI in FIG. 3.

As shown in FIG. 6, the press-fittable member 13 comprises a core 18 made of a high-rigidity material, such as steel, and a fixable portion 19 which is formed of an elastic body made, for example, of synthetic rubber, and fixed onto the core 18 to cover an lower end thereof. The core 18 of the press-fittable member 13 is formed in a shaft shape which has an outer diameter less than an inner diameter of the receiving section 12 consisting of a through-hole. The core 18 is fixedly attached to the convex portion 14 of the hood-side bracket 7 by forming a crimped portion 21 at an upper end thereof The convex portion 14 of the hood-side bracket 7 is formed with a downward-concaved depression 22, and an insertion hole 20 for allowing the core 18 of the press-fittable member 13 to be inserted therethrough (see FIG. 2).

The fixable portion 19 of the press-fittable member 13 has a tip end (lower end) which is formed with a tapered surface narrowed toward a tip thereof to serve as an engagement guide region 23 for guiding engagement with the receiving section 12, and an anchor end which is formed with a tapered surface inclined in a direction opposite to an incarnation of the engagement guide region 23 to serve as an engagement holding region 24. The engagement guide region 23 is inserted from above into the receiving section 12 downward while deforming the fixable portion 19 of the press-fittable member 13 to have a reduced diameter, so that the engagement holding region 24 is brought into press contact with a bottom surface around a peripheral edge of the receiving section 12 to allow the fixable portion 19 of the press-fittable member 13 to be detachably fitted in the receiving section 12. The tapered surface forming the engagement guide region 23 of the fixable portion 19 has an inclination angle $\theta 1$ relative to an axis of the press-fittable member or the core, which is set to be less than an inclination angle $\theta 2$ of the tapered surface forming the engagement holding region 24. Thus, as compared with the engagement holding region 24, the engagement guide region 23 has a more acute-angled tapered shape.

Figure 2:
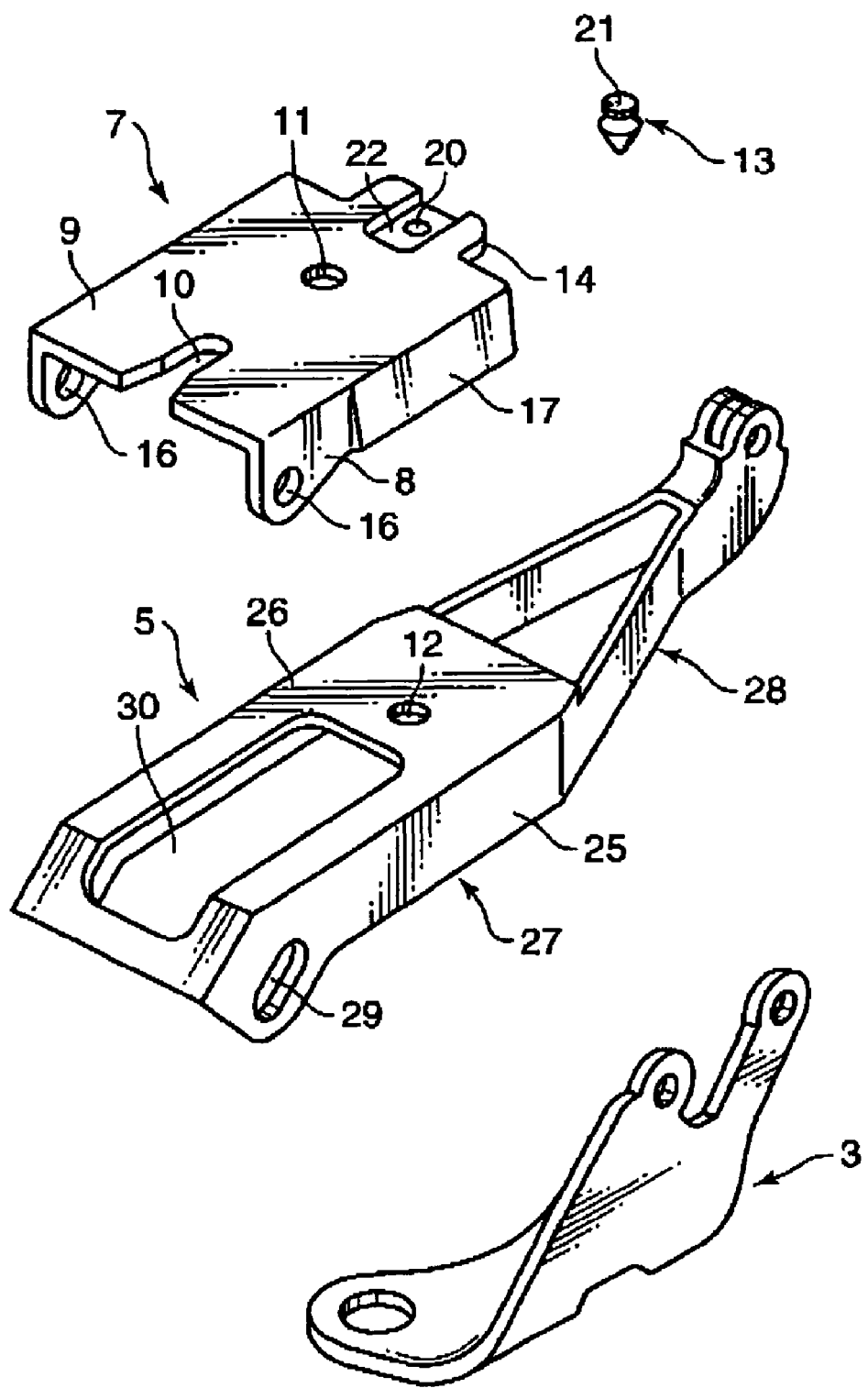
FIG. 2 is an exploded perspective view showing the structure of a support mechanism for supporting a rear end of a hood, in the vehicle hood structure according to the first embodiment.
Figure 3:
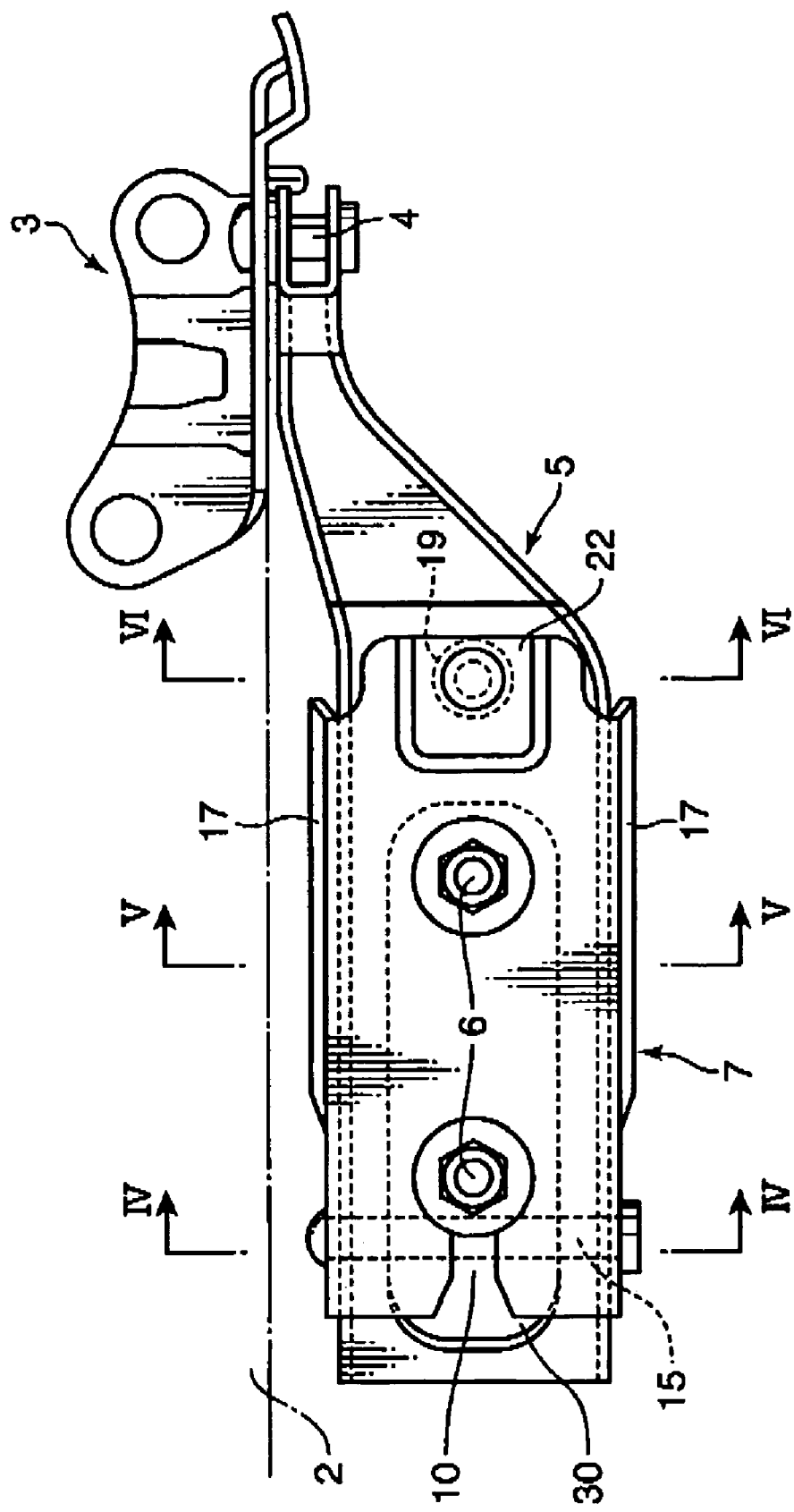
FIG. 3 is a top plan view of the structure of the support mechanism in FIG. 2.
Figure 4:
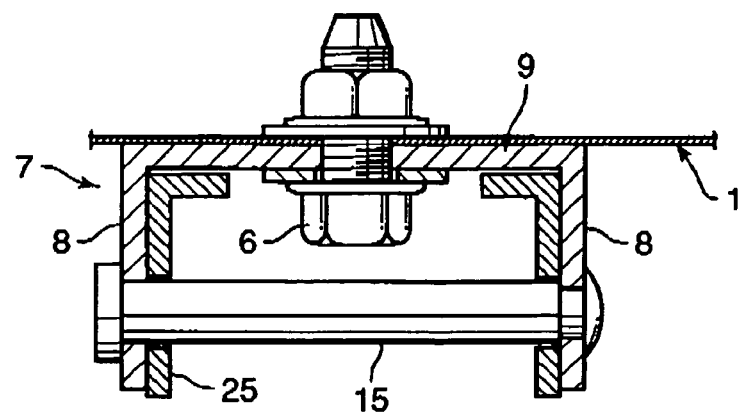
FIG. 4 is a sectional view taken along the line IV-IV in FIG. 3.

As shown in FIGS. 1 and 2, the link member 5 comprises a link body 27 with a sectionally angular C shape which has a pair of right and left side walls 25 and a top wall 26 connecting respective upper edges of the side walls 25 together, and a link anchor portion 28 extending rearward continuously from the side walls 25. This link anchor portion 28 has a rear end pivotally supported by the hinge bracket 3 through the first pivot member 4. Thus, the link member 5 is coupled to the vehicle body through the hinge bracket 3, and swingably supported in a pivoted manner by the first pivot member 4.

The top wall 26 of the link member 5 has a width less than that of the mounting base wall 9 of the hood-side bracket 7 to allow the link body 27 to be inserted between the pair of right and left side walls 8 of the hood-side bracket 7. Each of the side walls of the link member 5 is formed with a guide slot 29 consisting of an elongated hole inclined frontward and downward. The second pivot member 15 composed of the coupling pin or the like is inserted into the guide slots 29 to rotatably couple the front end of the link member 5 to the front end of the hood-side bracket 7 through the second pivot member 15.

The top wall 26 of the link member 5 is formed with a through-hole 30 for preventing the mounting bolts 6 from interfering with the link member 5 when the link body 27 is inserted along the bottom surface of the hood-side bracket 7, and facilitating reduction in weight. The top wall 26 also has the aforementioned through-hole formed at a given position to allow the fixable portion 19 of the press-fittable member 13 to be inserted thereinto so as to serve as the receiving section 12. Typically, before an operation of opening and closing the hood 1, an intermediate portion of the link member 5 is integrally connected to the rear portion of the hood-side bracket 7 by fixing the fixable portion 19 of the press-fittable member 13 attached to the rear end of the hood-side bracket 7, to the receiving section 12 formed in the link member 5, and then the front end of the link member 5 and the front end of the hood-side bracket 7 are integrally coupled to each other through the second pivot member 15. In this state, the hood 1 is opened or closed about the first pivot shaft 4 located in the hinge bracket 3.

Figure 7:
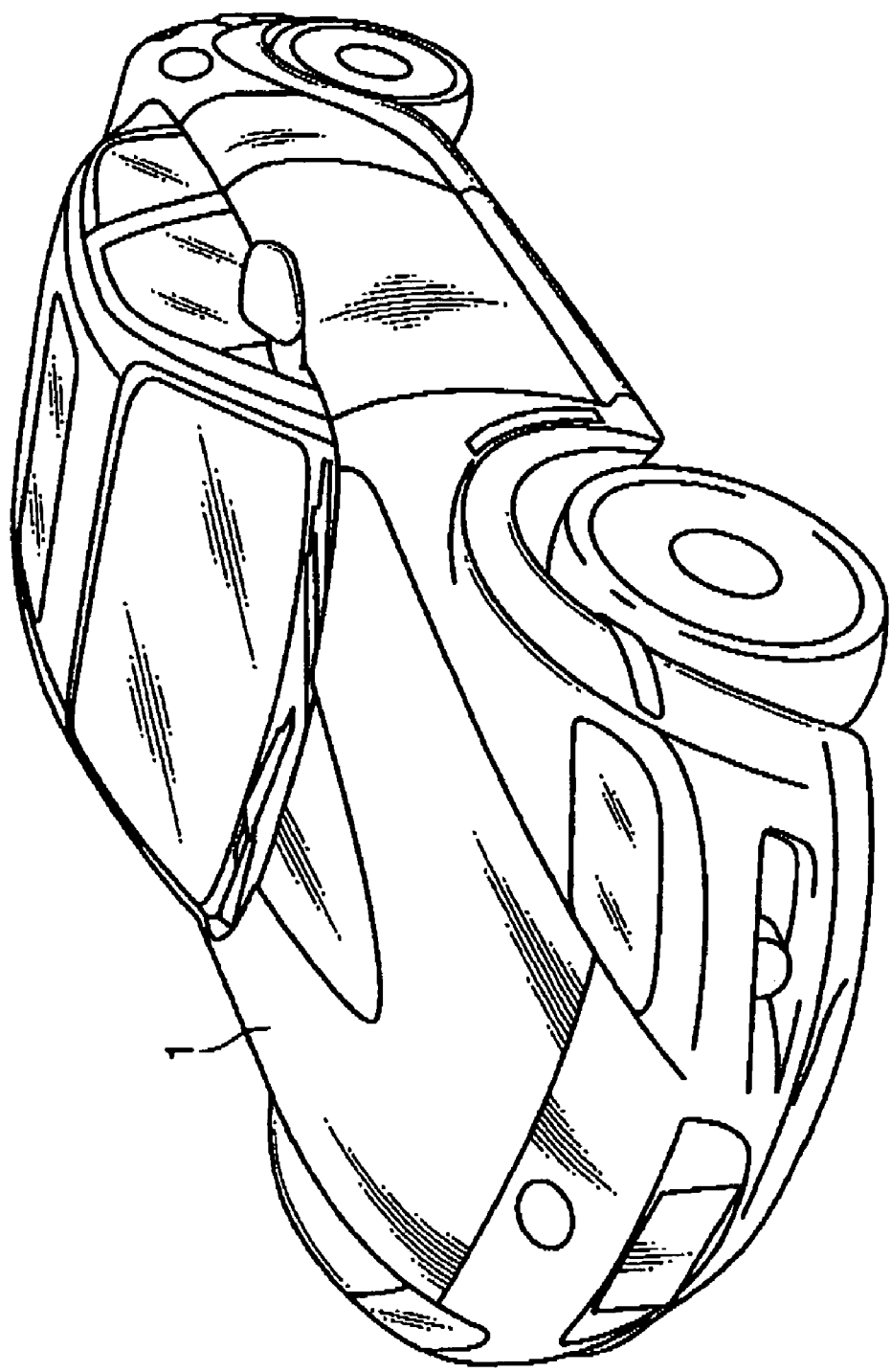
FIG. 7 is a perspective overall view showing the vehicle in a full closed state of the hood in FIG. 1.
Figure 8:
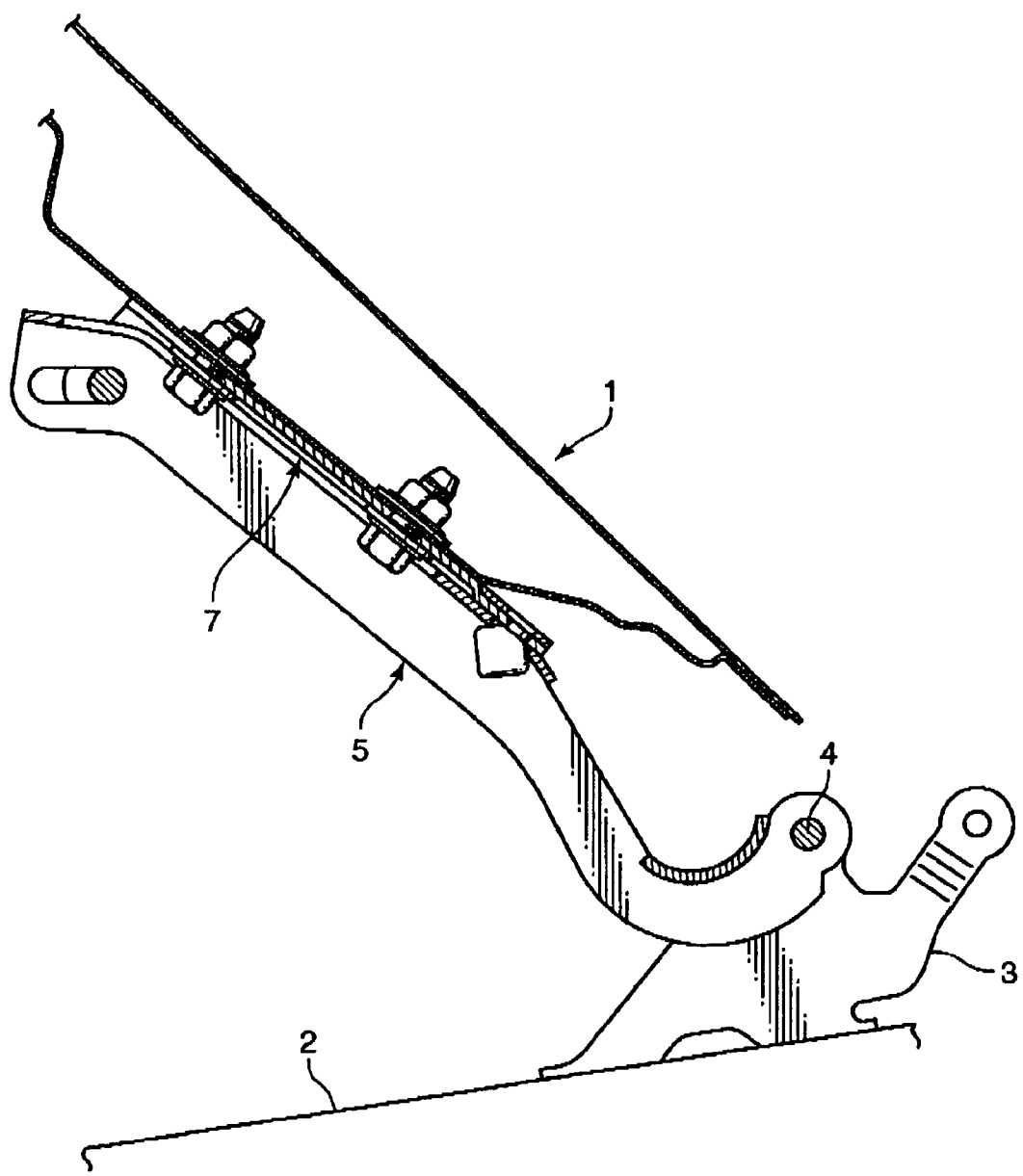
FIG. 8 is a sectional side view showing the vehicle hood structure in FIG. 1 in a full open state of the hood.

Thus, in the condition where a restriction mechanism consisting of the press-fittable member 13 and the receiving section 12 restricts the link member 5 from being separated away from the hood 1, a locked state of the hood 1 based on a lock mechanism (not shown) provided at the front end of the hood 1 is released, and then the front end of the hood 1 in a full closed position as shown in FIGS. 1 and 7 is lifted upward. Though this operation, the front end of the link member 5 and the hood-side bracket 7 can be swingingly displaced upward about the first pivot member 4 to move the hood 1 to a full open position, as shown in FIG. 8. Further, in the condition where the link member 5 and the hood-side bracket 7 are integrally coupled to each other, the hood 1 can be locked at the full closed position to stably keep the hood 1 in the locked state while preventing the rear end of the hood 1 from being moved up and down during running of the vehicle.

Figure 9:
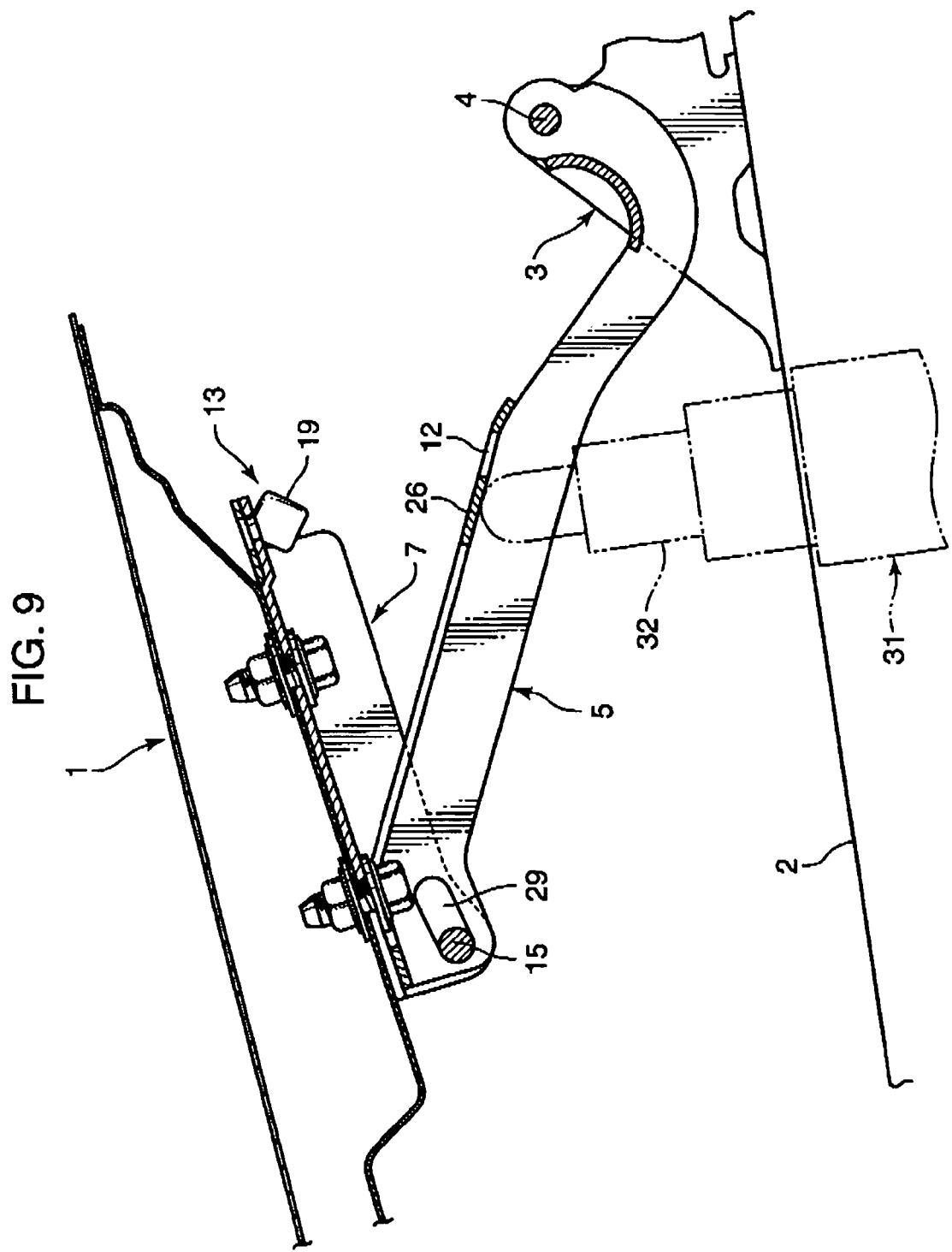
FIG. 9 is a sectional side view showing the vehicle hood structure in FIG. 1 in a state after the rear end of the hood is lifted.

When a sensor (not shown) detects that the front end of the vehicle body comes into contact with an obstacle during running of the vehicle, an inflator or the like of a push-up drive device 31 disposed below the link member 5 is activated to bias the top wall 26 of the link member 5 upward, so that the front end of the link member 5 is pushed upward about the first pivot member 4, and the rear end of the hood 1 is pushed upward about the lock at the front end of the vehicle body, as shown in FIG. 9. Thus, the fixable portion 19 of the press-fittable member 13 is separated from the receiving section 12 to release the coupled state between the link member 5 and the hood-side bracket 7 so as to permit the link member 5 to be swingingly displaced about the second pivot member 15 in a direction away from the hood 1.

Figure 10:
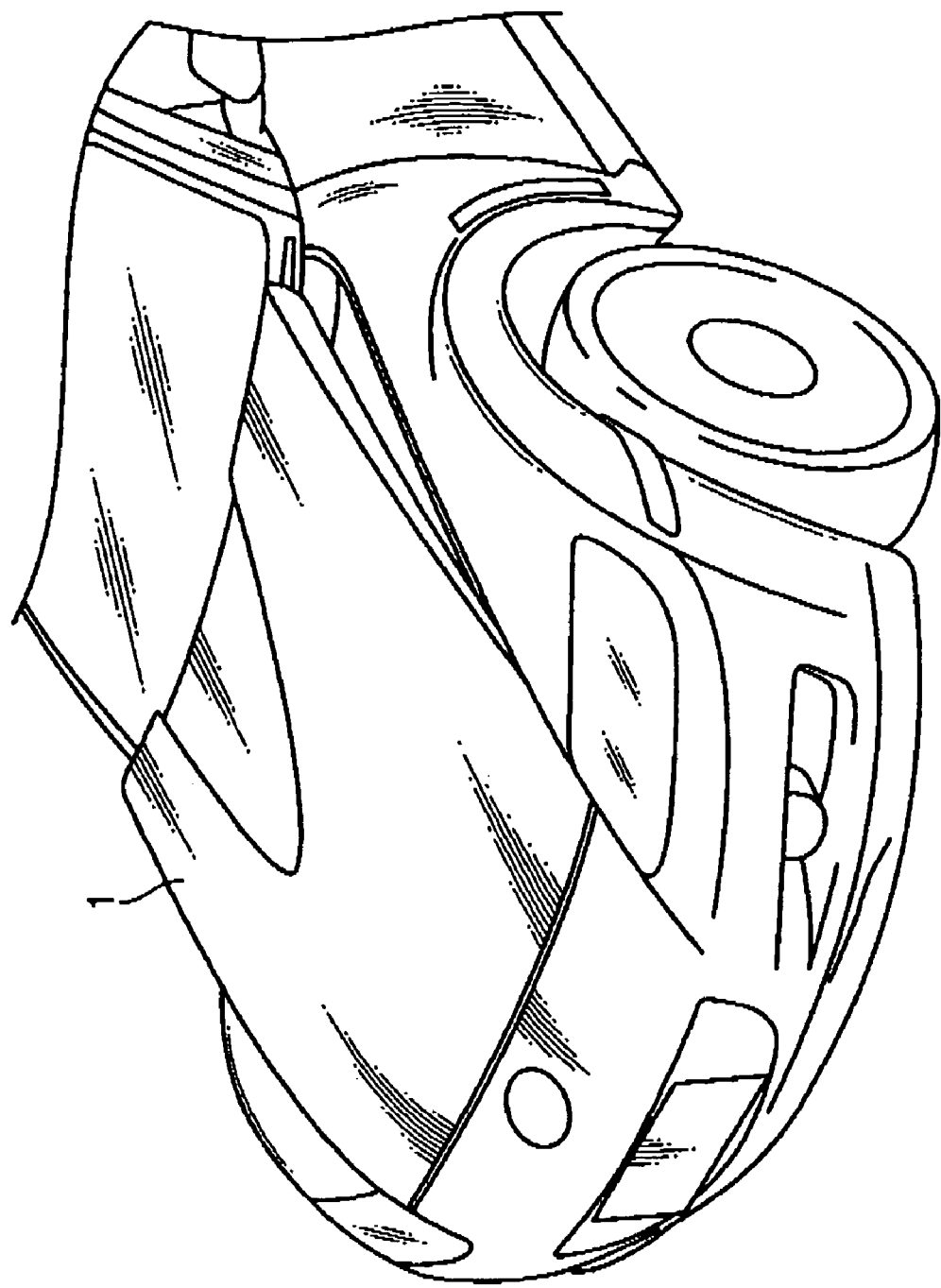
FIG. 10 is a perspective overall view showing a vehicle in the state after the rear end of the hood is lifted.

As above, according to the biasing force of the push-up drive device 31, the hood-side bracket 7 is allowed to be swingingly displaced about the second pivot member 15 in the condition where the front end of the hood 1 is locked in the full closed position by the lock mechanism. Thus, as shown in FIGS. 9 and 10, an extendable push rod 32 of the push-up drive device 31 is extended to push the rear end of the hood 1. Further, the second pivot member 15 is slidingly displaced frontward along the guide slot 29 of the link member 5, and the link member 5 is swingingly displaced about the first pivot member 4, so that the front end of the link member 5 is moved upward.

Subsequently, when the rear end of the hood 1 lifted by the push-up drive device 31 is pushed downward, the rear end of the hood 1 is moved downward while being supported by the link member 5 which is coupled to the hood-side bracket 7 through the second pivot member 15. In conjunction with this movement, the link member 5 is swingingly displaced about the first pivot member 4, and the front end of the link member 5 is moved downward to the initial position as shown in FIG. 1. When the hood 1, the hood-side bracket 7 and the link member 5 are moved to their initial positions, the fixable portion 19 of the press-fittable member 13 is brought into press contact with the receiving section 12, and the fixable portion 19 is deformably reduced in diameter and fitted in the receiving section 12. Thus, the link member 5 and the hood-side bracket 7 are integrally coupled to each other or returned to the initial state.

As mentioned above, the vehicle hood structure disposed in the front region of the vehicle body and supported in an openable and closable manner is provided with the link member 5 swingably supported in a pivoted manner by the first pivot member 4 located on the vehicle body, and a restriction mechanism which includes a restricting element consisting of the press-fittable member 13 located in the rear end of the hood 1, and a restricted element consisting of the receiving section 12 located in the link member 5. The link member 5 is coupled to the rear end of the hood 1 through the restriction mechanism so as to be restricted from being separated away from the hood 1. Thus, in a normal state, the rear end of the hood 1 is coupled to the link member 5, so that the hood 1 can be smoothly opened and closed about the first pivot portion 4 located in the hinge bracket 3. Further, during running of the vehicle, the hood 1 can be stably kept in the locked state while preventing the rear end of the hood 1 from being moved up and down.

The fixable portion 19 of the press-fittable member 13 is designed to be detachably fitted in the receiving section 12 while being deformably reduced in diameter. Thus, in the event of a collision between the front end of the vehicle body and an obstacle, the push-up drive device 31 is activated to bias the top wall 26 of the link member 5 upward, so that the fixable portion 19 of the press-fittable member 13 can be separated from the receiving section 12 to release the coupled state between the link member 5 and the hood-side bracket 7. Therefore, as shown in FIGS. 9 and 10, the rear end of the hood 1 can be moved upward according to the biasing force of the push-up drive device 31 to sufficiently ensure a downward stroke of the hood 1, for example, when the above obstacle falls onto the hood 1, and deform the hood 1 so as to effectively reduce an impact load to be applied to the obstacle.

Further, after the occurrence of the impact collision, the rear end of the hood 1 lifted as described above is pushed downward to move the hood-side bracket 7 and the link member 5 to their initial position, so that the fixable portion 19 of the press-fittable member 13 can be fitted in the receiving section 12 while being deformably reduced in diameter. This makes it possible to readily return to the initial state without any complicated operation, such as an operation of coupling the link member 5 and the hood-side bracket 7 together using a new coupling member. Thus, when the hood 1 is returned to the initial position to run the vehicle again after the rear end of the hood 1 is lifted due to occurrence of the above collision or malfunction of the push-up drive device 31, the hood 1 can be stably kept in the locked state while preventing the rear end of the hood 1 from being moved up and down, to effectively prevent the occurrence of a wobbling movement of the hood 1 during running of the vehicle, in a simplified structure.

In the first embodiment, the anchor end of the link member 5 is pivotally supported by the first pivot member 4, and the front end of the link member 5 is pivotally supported by the hood 1 (specifically, the hood-side bracket 7 attached to the bottom surface of the rear end of the hood 1) through the second pivot member 15. Further, the restriction mechanism including the press-fittable member 13 and the receiving section 12 is designed to restrict the link member 5 from being displaced about the second pivot member 15 and separated away from the hood 1. This makes it possible to, in the event of the collision, adequately release the coupled state between the intermediate portion of the link member 5 and the rear end of the hood-side bracket 7, and, after release of the coupled state, facilitate the operation of returning the intermediate portion of the link member 5 and the rear end of the hood-side bracket 7 to their initial positions.

Specifically, instead of the second pivot member 15, a protrusion formed in the side surface of the front end of the hood-side bracket 7 may be fitted into a depression formed in the side surface of the front end of the link member 5, or two pairs of front and rear press-fittable members 13 and press-fittable-member receiving sections 12 may be provided, to achieve a first state in which the link member 5 and the hood-side bracket 7 are coupled to each other to restrict the link member 5 from being separated away from the hood, and a second state where the link member 5 and the hood-side bracket 7 are completely separated from each other. In this case, it is necessary to provide means for restricting a distance of jumping-up of the hood 1 separated away from the link member 5, such as a wire member, and perform a complicated operation of integrally coupling the link member 5 and the hood-side bracket 7 to each other while positioning them, after release of the coupled state.

In contrast, when the front end of the link member 5 is pivotally supported by the hood-side bracket 7 through the second pivot member 15 as in the first embodiment, the fixable portion 19 of the press-fittable member 13 can be smoothly separated away from the link member 5 by biasing the link member 5 in a direction allowing the hood-side bracket 7 to be swingingly displaced about the second pivot member 15 and separated away from the link member 5. Further, the second pivot member 15 also makes it possible to maintain the coupled state between the hood 1 and the hood-side bracket 7 and the link member 5 so as to prevent the jumping-up of the hood 1.

Further, the rear end of the hood 1 at the lifted position as shown in FIGS. 9 and 10 can be pushed downward to swingingly displace the hood-side bracket 7 downward about the second pivot member 15 and swingingly displace the link member 5 about the first pivot member 4 so as to automatically move the front end of the link member 5 to the initial position illustrated in FIG. 1. Thus, the fixable portion 19 can be fitted in the receiving section 12 to integrally couple the link member 5 to the hood-side bracket 7 only by pushing the rear end of the hood 1 downward without the complicated operation of holding the link member 5 and the hood-side bracket 7 after release of the coupled state while positioning them.

In the first embodiment, the tapered surface narrowed toward the tip is formed in the tip end of the fixable portion 19 to serve as the engagement guide region 23 for guiding the engagement with the receiving section 12. Thus, during the course of the operation of pushing the rear end of the hood 1 downward, when the fixable portion 19 is press-fitted into the receiving section 12 while being deformably reduced in diameter, the tapered surface of the engagement guide region 23 can be used as a guide surface to perform the press-fitting operation for the fixable portion 19 readily and adequately.

As in the first embodiment, the engagement holding region 24 consisting of the tapered surface inclined in the opposite direction to the inclination of the engagement guide region 23 formed in the tip end of the fixable portion 19 may further be formed in the fixable portion 19 on the side of a base end of the engagement guide region 23. In this case, when the fixable portion 19 fitted in the receiving section 12 is displaced while being deformably reduced in diameter, and separated from the receiving section 12, the taper surface of the engagement holding region 24 can be used as a guide surface to allow the fixable portion 19 to be separated from the receiving section 12 readily and adequately so as to release the coupled state between the rear end of the hood 1 and the link member 5.

Particular, in the first embodiment, the inclination angle $\theta 1$ of the tapered surface forming the engagement guide region 23 of the press-fittable member 13 is set to be less than the inclination angle $\theta 2$ of the tapered surface forming the engagement holding region 24, so that the engagement guide region 23 has a more acute-angled tapered shape than the engagement holding region 24. In this case, when the rear end of the hood 1 is pushed downward to press-fit the fixable portion into the receiving section 12, the tapered surface of the engagement guide region 23 can sufficiently exert a guiding function to allow the fixable portion 19 to be smoothly fitted into the receiving section 12. In addition, the inclination angle $\theta 2$ of the tapered surface of the engagement holding region 24 set to be greater than the inclination angle $\theta 1$ of the tapered surface of the engagement guide region 23 makes it possible to prevent the fixable portion 19 from being separated from the receiving section 12 in the normal state so as to stably hold the press-fittable member 13 in a fitted position, while maintaining the guide function when the fixable portion 19 is separated from the receiving section 12.

In the first embodiment, the press-fittable member 13 comprises the core 18 made of a high-rigidity material, and the fixable portion formed of an elastic body to cover the core 18, and the outer diameter of the shaft-shaped core 18 is set to be less than the inner diameter of the receiving section 12 as a through-hole. Thus, the press-fittable member 13 can be stably fitted into the receiving section 12. Further, in the operation of separating the fixable portion 19 from the receiving section 19 to release the coupled state between the rear end of the hood 1 and the link member 5, the core 18 can prevent the press-fittable member 13 from being excessively deformed even if a certain bending or torsion force is applied to the press-fittable member 13. This makes it possible to adequately separate the fixable portion 19 from the receiving section 12 according to need, without occurrence of damages, for example, in the fixable portion 19.

Figure 5:
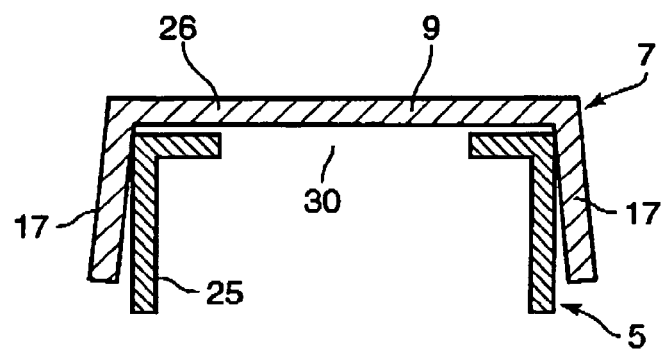
FIG. 5 is a sectional view taken along the line V-V in FIG. 3.

In the first embodiment, as shown in FIG. 5, each rearward region of the side walls 8 of the hood-side bracket 7 is formed as the spread portion 17 having the lower edge spread outward. Thus, when the link member 5 located spaced apart from the bottom surface of the hood-side bracket 7 as shown in FIG. 9 is swingingly displaced and moved into the hood-side bracket 7 as shown in FIG. 1, a contact area between the side walls of the hood-side bracket 7 and the side walls 25 of the link member 5 can be reduced to allow the link member 5 to be swingingly displaced smoothly.

While the first embodiment has been described in an example where the press-fittable member 13 is located in the hood-side bracket 7, and the receiving section 12 is located in the link member 5, the press-fittable member 13 may be located in the link member 5, and the receiving section 12 is formed in the hood-side bracket 7. Further, in place of the structure in the first embodiment where the link member 5 is biased upward by the extendable push rod 32 of the push-up drive device 31 disposed below the link member 5, to separate the fixable portion 19 of the press-fittable member 13 from the receiving member 12, the push-up drive device may be designed to push the mounting base wall 9 of the hood-base bracket 7 or the hood 1 upward so as to separate the fixable portion 19 of the press-fittable member 13 from the receiving member 12.

Further, in place of the push-up drive device 31 having the extendable push rod 32 to be extended in response to the activation of the inflator, the push-up drive device may be a helical spring associated with the first pivot member 4 and adapted to bias the front end of the link member 5 upward. Alternatively, the push-up drive device may be designed to automatically lift the rear end of the hood 1 according to a reaction force from an impact load acting during collision so as to separate the fixable portion 19 of the press-fittable member 13 from the receiving member 12.

FIGS. 11 to 16 show a vehicle hood structure according to a second embodiment of the present invention.

In this vehicle hood structure, a catching member 41 constituting a restriction mechanism is disposed between a hood-side bracket 7 and a hood inner panel 1a. The hood-side bracket 7 has a mounting base wall 9 which is formed with a notched groove 43 and an insertion hole 44 each serving as an insertion portion for the mounting bolts 6, and a downward-concaved depression 22 in a rear (relative to the vehicle body) end thereof.

The catching member 41 has a width set to be less than that of a link member 5. The catching member 41 has an anchor base portion 46 formed with two insertion holes 45 for the mounting bolts 6, a downward-extending portion 47 extending downward from a rear edge of the anchor base portion 46, and a sectionally arc-shaped hook portion 48 formed at a lower end of the downward-extending portion 47 to protrude frontward, i.e., toward a mounting position of the anchor base portion 46. The catching member 41 is supported by a bottom surface of a rear end of a hood 1 in a cantilevered manner, specifically, in such a manner that the anchor base portion 46 of the catching member 41 is clamped or sandwiched between the hood inner panel 1a and the mounting base wall 9 of the hood-side bracket 7, and a rear end portion of the catching member 41 including the downward-extending portion 47 and the book portion 48 protrudes downward from a position on a rearward side of the hood-side bracket 7.

The link member 5 has a top wall 26 which is formed with two through-holes 49, 50 for preventing the mounting bolts 6 from interfering with the link member 5 when the link member 5 is inserted along a bottom surface of the hood-side bracket 7, and facilitating reduction in weight. Further, an engageable portion 51 adapted to be disengageably engaged with the catching member 41 is fixedly attached to respective longitudinally central positions of right and left side walls 25 of the link member 5 by means of welding or the like. This engageable portion 51 has a sectionally arc-shaped engagement guide region 52 protruding rearward (relative to the vehicle body), and an extension region 53 extending frontward (relative to the vehicle body) from an upper edge of the engagement guide region 52. This engageable portion 51 is disposed such that an open surface (lower surface) of the link member 5 is partially covered by the extension region 53.

In a normal state, the hook portion 48 of the catching member 41 supported by the hood 1 in a cantilevered manner is located below the engagement guide region 52 of the engageable portion 51 fixed to the link member 5, and a bottom surface of the depression 22 formed in the mounting base wall 9 of the hood-side bracket 7 is in press contact with the top wall 26 of the link member 5, so that an engagement state is established. In this engagement state, an intermediate portion of the link member 5 and the rear end of the hood 1 are integrally coupled to each other, and a front end of the link member 5 and a front end of the hood-side bracket 7 are integrally coupled to each other through the aforementioned second pivot member 15, so that the hood 1 can be opened and closed about the aforementioned first pivot member 4 located in the hinge bracket 3.

Figure 11:
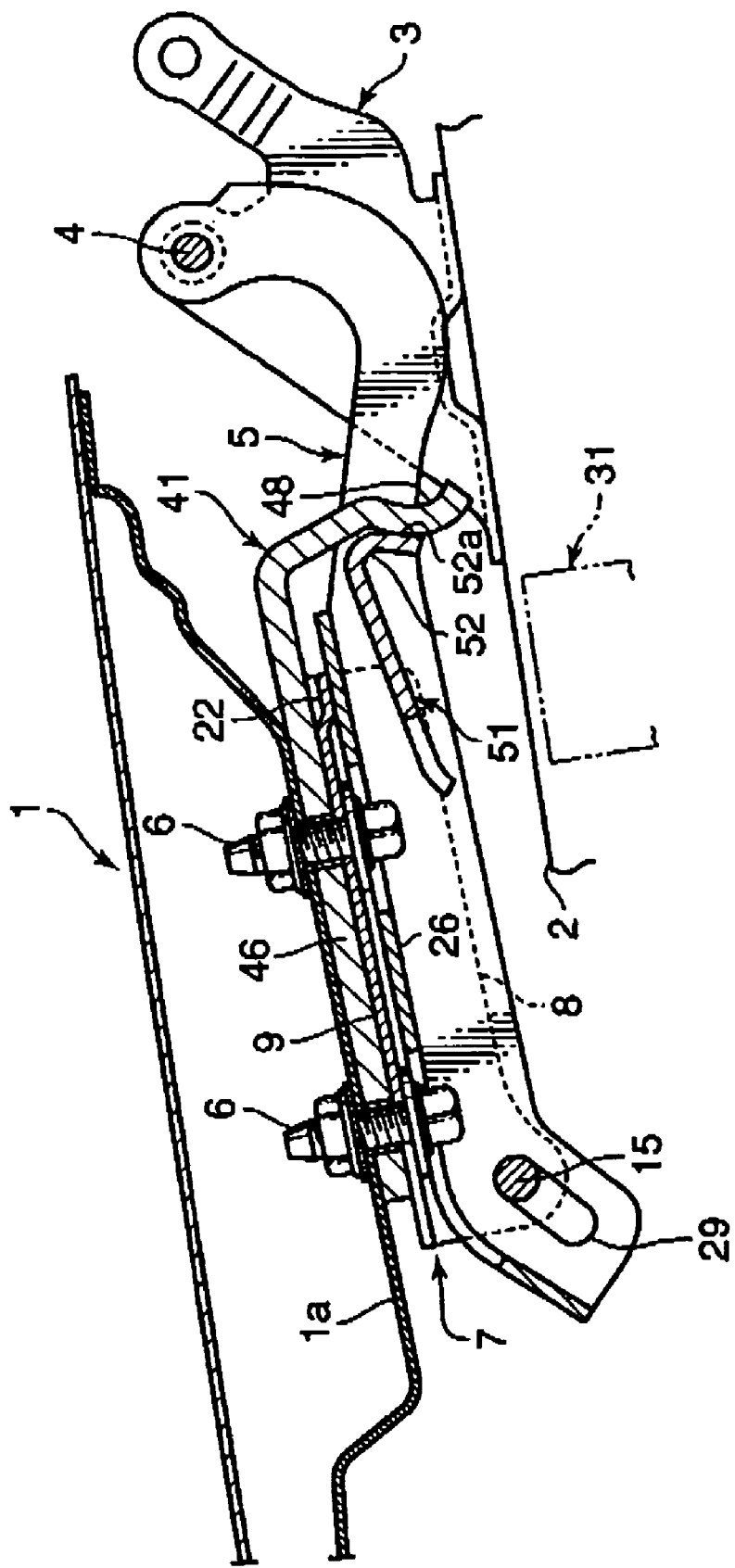
FIG. 11 is a sectional side view showing a vehicle hood structure according to a second embodiment of the present invention.
Figure 12:
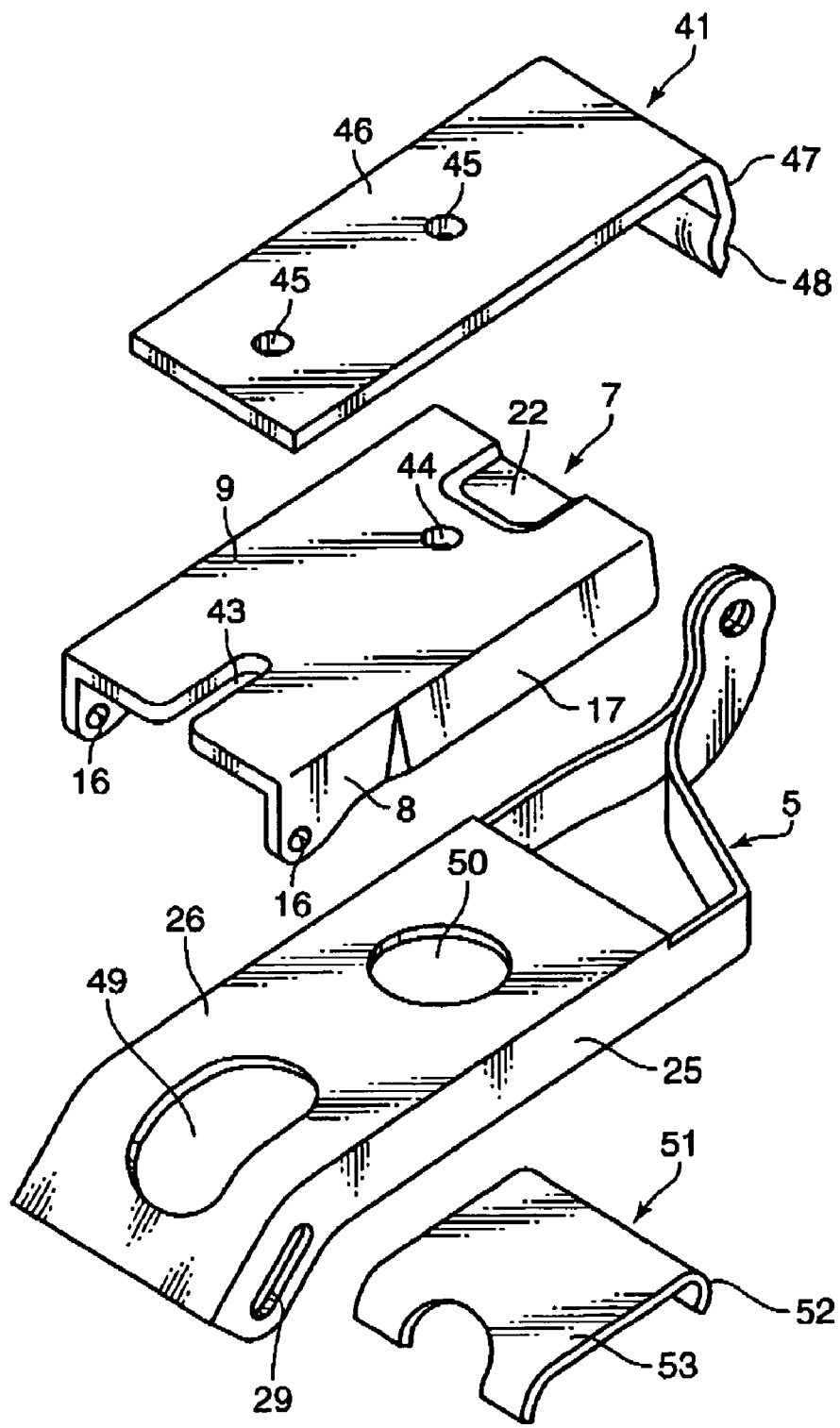
FIG. 12 is an exploded perspective view showing the structure of a support mechanism for supporting a rear end of a hood, in the vehicle hood structure according to the second embodiment.
Figure 13:
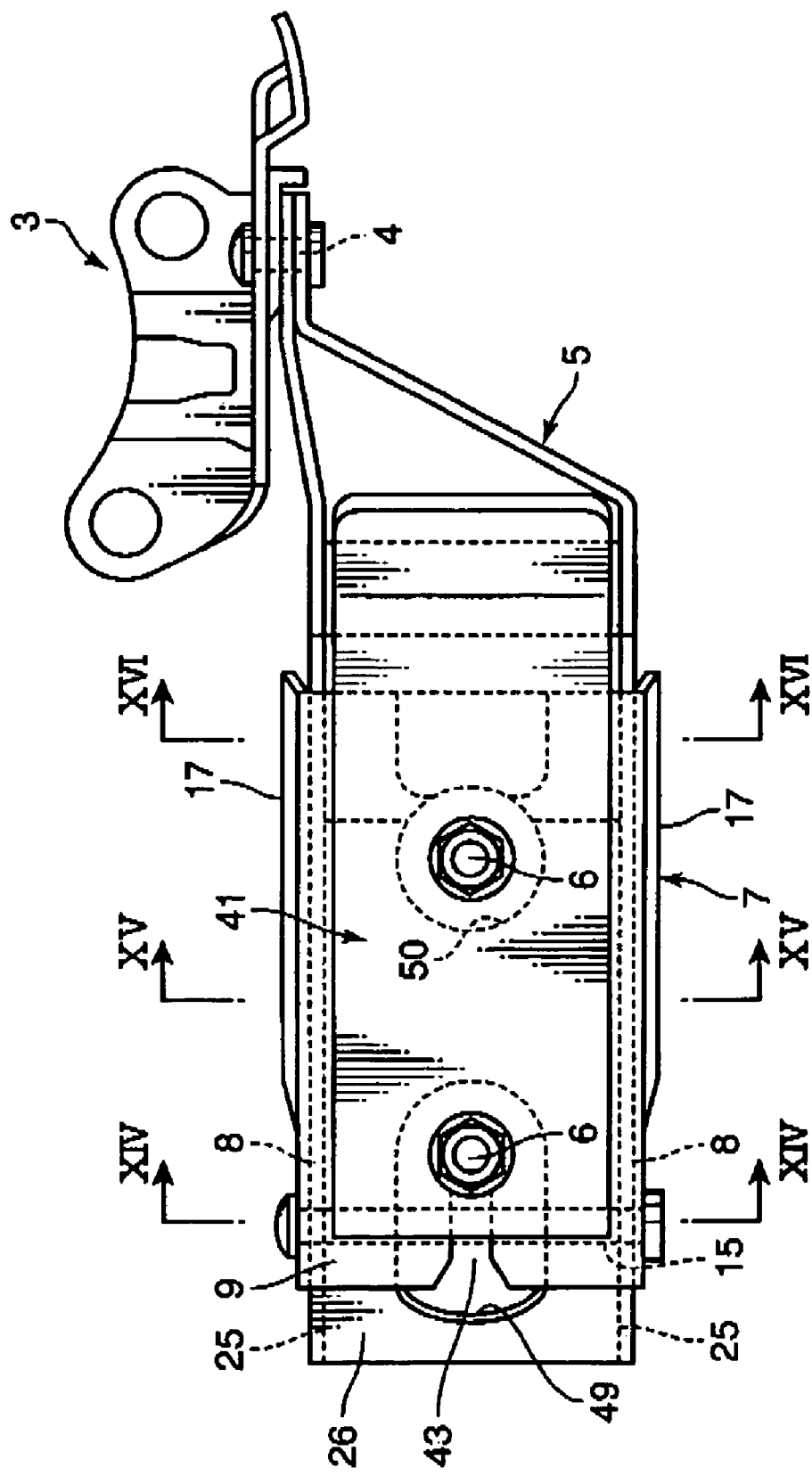
FIG. 13 is a top plan view of the structure of the support mechanism in FIG 12.
Figure 14:
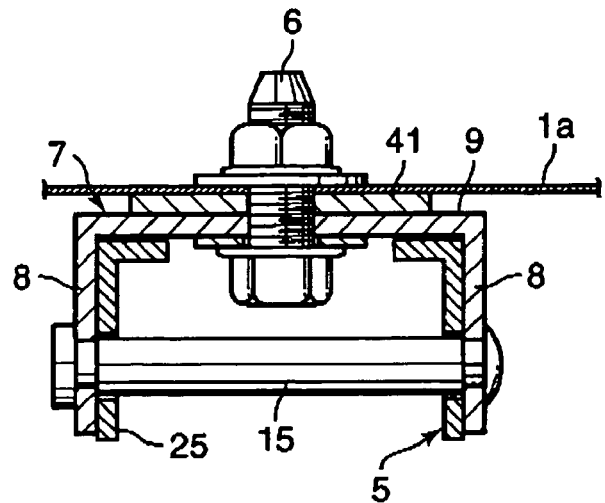
FIG. 14 is a sectional view taken along the line XIV-XIV in FIG. 13.
Figure 15:
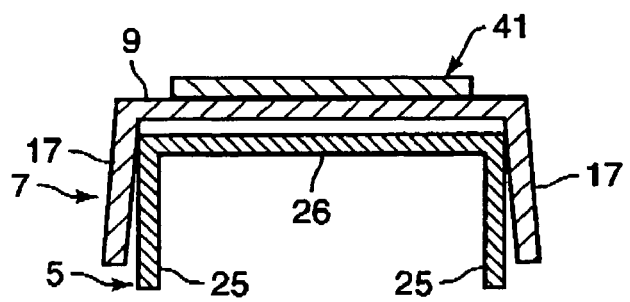
FIG. 15 is a sectional view taken along the line XV-XV in FIG. 13.
Figure 16:
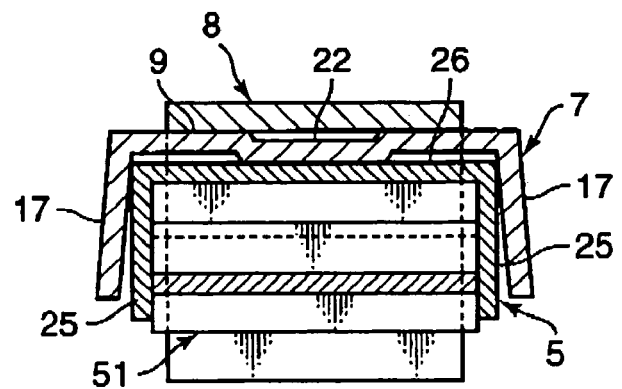
FIG. 16 is a sectional view taken along the line XVI-XVI in FIG. 13.
Figure 17:
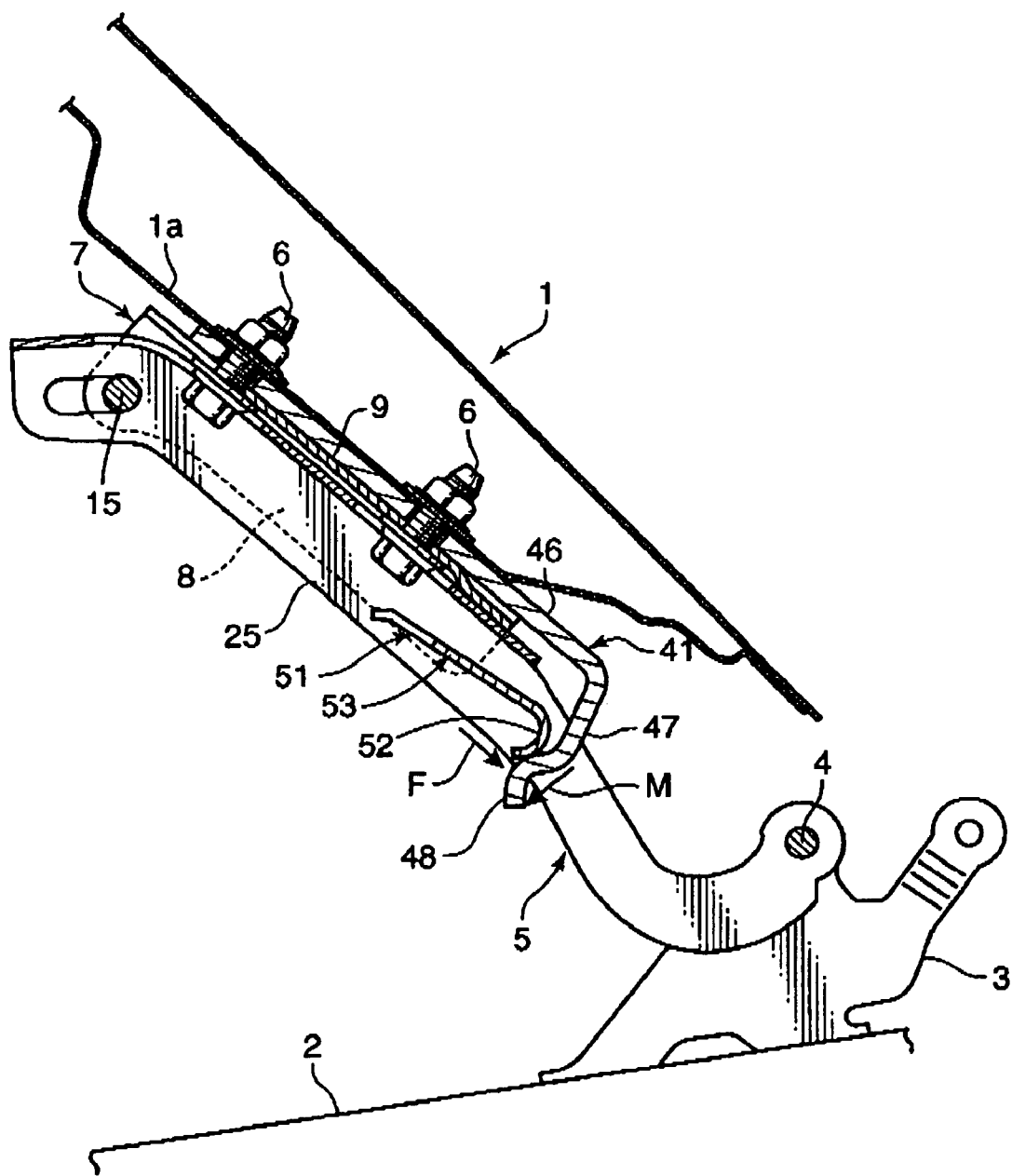
FIG. 17 is a sectional side view showing the vehicle hood structure in FIG. 11 in a full open state of the hood.

Thus, in the condition where a restriction mechanism consisting of the caching member 41 and the engageable portion 51 restricts the link member 5 from being swingingly displaced about the second pivot member 15 and separated away from the hood 1, a locked state of the hood 1 based on a lock mechanism (not shown) provided at a front end of the hood 1 is released, and then the front end of the hood 1 in a full closed position as shown in FIG. 11 is lifted upward. Though this operation, the front end of the link member 5 can be swingingly displaced upward about the first pivot member 4 to move the hood 1 to a full open position, as shown in FIG. 17. Further, in the condition where the rear end of the hood 1 and the link member 5 are integrally coupled to each other, the hood 1 can be locked at the full closed position to stably keep the hood 1 in the locked state while preventing the rear end of the hood 1 from being moved up and down during running of the vehicle.

When a sensor (not shown) detects that the front end of the vehicle body comes into contact with an obstacle during running of the vehicle, an inflator or the like of a push-up drive device 31 disposed below the link member 5 is activated to extend an extendable push rod 32 in such a manner that the extension region 53 of the engageable portion 51 fixed to the link member 5 is biased upward. Thus, the front end of the link member 5 is pushed upward about the first pivot member 4, and the rear end of the hood 1 is pushed upward about the lock at the front end of the vehicle body. Through this movement, the hook portion 48 of the catching member 41 supported by the hood 1 in a cantilevered manner is elastically deformed in a direction allowing the hook portion 48 to be expanded (in a direction away from the engageable portion 51) to release the coupled state between the hook portion 48 of the catching member 41 and the engageable portion 51 so as to permit the link member 5 to be swingingly displaced about the second pivot member 15 in a direction away from the hood 1.

Figure 18:
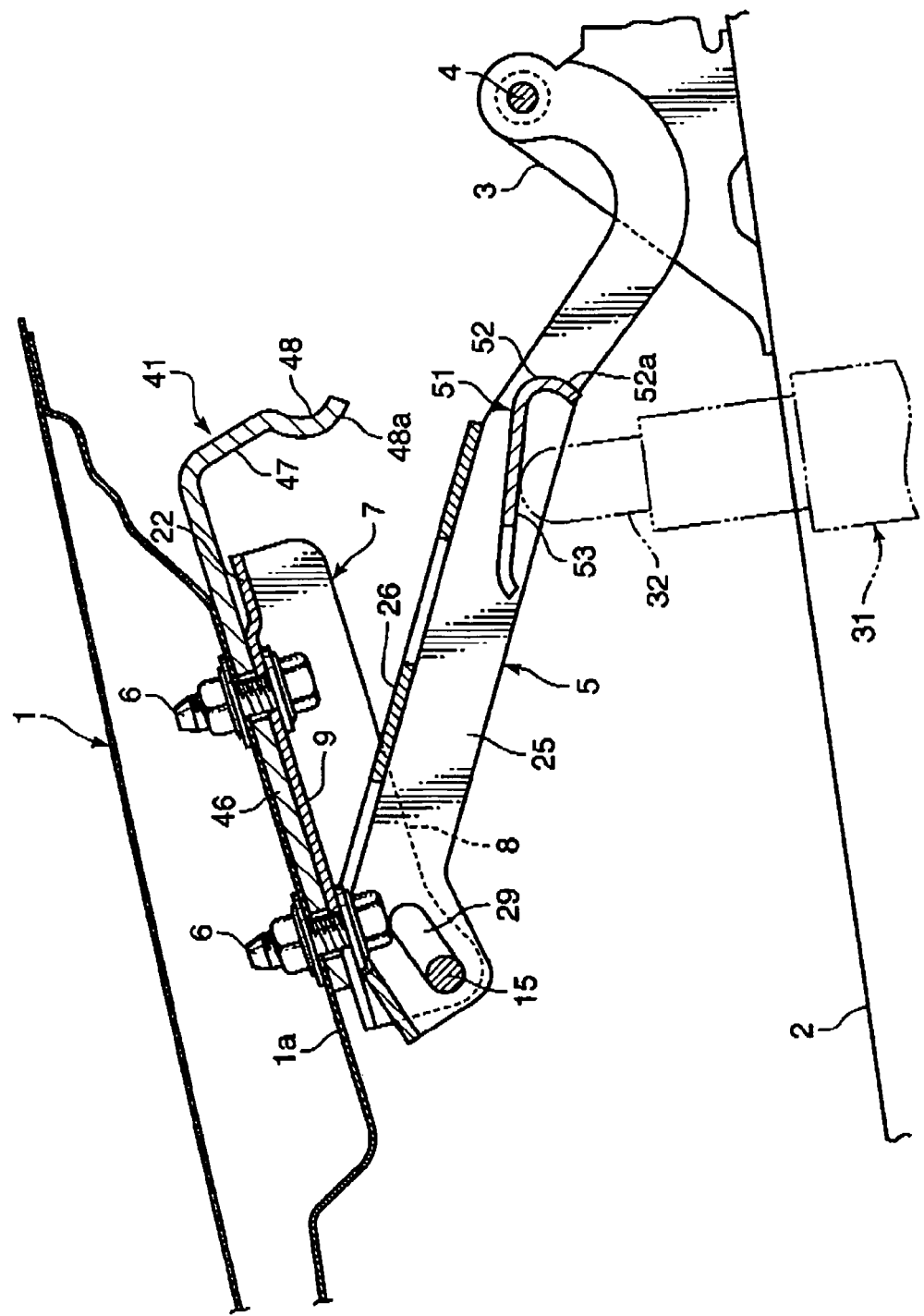
FIG. 18 is a sectional side view showing the vehicle hood structure in FIG. 11 in a state after the rear end of the hood is lifted.

As above, according to the biasing force of the push-up drive device 31, the link member 5 is allowed to be swingingly displaced about the first pivot member 4 in the condition where the front end of the hood 1 is locked in the full closed position by the lock mechanism. Thus, as shown in FIG. 18, the rear end of the hood 1 is pushed upward. Further, the second pivot member 15 is slidingly displaced frontward along a guide slot 29 of the link member 5, and the link member 5 is swingingly displaced about the first pivot member 4, so that the front end of the link member 5 is moved upward.

Subsequently, when the rear end of the hood 1 pushed up by the push-up drive device 31 is pushed downward, the rear end of the hood 1 is moved downward while being supported by the link member 5 which is coupled to the hood-side bracket 7 through the second pivot member 15. In conjunction with this movement, the link member 5 is swingingly displaced about the first pivot member 4, and the front end of the link member 5 is moved downward to the initial position as shown in FIG. 1. When the hood 1, the catching member 41 and the link member 5 are moved downward to their initial positions, a lower end surface (inclined surface 48a) of the hook portion 48 of the catching member 41 is brought into press contact with an upper end surface of the engagement guide region 52 of the engageable portion 51, and the hook portion 48 of the catching member 41 is moved below the engagement guide region 52 while being elastically deformed, and engaged with the engageable portion 51. Thus, the link member 5 and the rear end of the hood-side bracket 7 are integrally coupled to each other through the restriction mechanism comprising the catching member 41 and engageable portion 51, or returned to the initial state.

According to the above structure, in the event of a collision between the front end of the vehicle body and an obstacle, the push-up drive device 31 is activated to bias the link member 5 upward, while maintaining the coupled state between the respective front ends of the link member 5 and the hood-side bracket 7 by the second pivot member 15, so that the catching member 41 can be separated from the engageable portion 51 to release the coupled state between the intermediate portion of the link member 5 and the rear end of the hood-side bracket 7. Therefore, as shown in FIG. 18, the rear end of the hood 1 can be moved upward according to the biasing force of the push-up drive device 31 to sufficiently ensure a downward stroke of the hood 1, for example, when the above obstacle falls onto the hood 1, and deform the hood 1 so as to effectively reduce an impact load to be applied to the obstacle.

Further, after the occurrence of the impact collision, the rear end of the hood 1 lifted as described above is pushed downward to move the hood 1 and the link member 5 downward to their initial position while swingingly displacing the link member 5 about the first pivot member 4, and rotatably displacing the link member 5 about the second pivot member 15 in a direction coming closer to the bottom surface of the rear end of the hood 1, so that the catching member 41 supported by the hood 1 in a cantilevered manner can be elastically deformed and re-engaged with the engageable portion 51. This makes it possible to readily return to the initial state without any complicated operation, such as an operation of coupling the link member 5 and the hood-side bracket 7 together using a new coupling member. Thus, when the hood 1 is returned to the initial position to run the vehicle again after the rear end of the hood 1 is lifted according to activation of the push-up drive device 31 during the above collision or due to malfunction of the push-up drive device 31, the hood 1 can be stably kept in the locked state while restricting the rear end of the hood 1 from being moved up and down by the restriction mechanism, to effectively prevent the occurrence of a wobbling movement of the hood 1 during running of the vehicle, in a simplified structure.

In the second embodiment, the sectionally arc-shaped engagement guide region 52 protruding rearward is formed in the engageable portion 51 and used as a guide surface for guiding the hook portion 48 in the direction allowing the hook portion 48 to be expanded, when the catching member 41 is re-engaged with the engageable portion 51. Thus, as shown in FIG. 18, according to the operation of pushing the rear end of the lifted hood 1 downward, the catching member 41 can be slidingly moved along the upper end surface of the engagement guide region 52 of the engageable portion 51. This makes it possible to smoothly move the hook portion 48 to the lower side of the engagement guide region 52, and readily re-engage the catching member 41 with the engageable portion 51.

Particularly, in the second embodiment, the hook portion 48 of the catching member 41 is formed in an arc shape in section, protruding frontward, in such a manner that an engagement guide surface for guiding reengagement between the catching member 41 and the engageable portion 51, or the inclined surface 48a extending rearward, is formed in the lower end of the hook portion 48. Thus, as shown in FIG. 18, according to the operation of pushing the rear end of the lifted hood 1 downward, the inclined surface 48a can be slidingly moved along the upper end surface of the engagement guide region 52 of the engageable portion 51. This makes it possible to smoothly move the hook portion 48 to the lower side of the engagement guide region 52, and readily re-engage the catching member 41 with the engageable portion 51.

In the second embodiment, the extension region 53 extending in a direction opposite to a direction in which the catching member 41 is guided by the engagement guide region 52, or extending frontward, is formed continuously from the engagement guide region 52 of the engageable portion 51. The extension region 53 can reinforce the engagement guide region 52 to adequately ensure the rigidity of the engagement guide region 52. This makes it possible to effectively prevent plastic deformation in the engageable portion 51 which is likely to occur when the hook portion 48 of the catching member 41 is engaged and disengaged with and from the engagement guide region 52 of the engageable portion 51, even if the catching member 41 has a width different from that of the engageable portion 51. Specifically, when the catching member 41 has a width different from that of the engageable portion 51, the hook portion 48 is locally brought into press contact with the engagement guide region 52 during an engagement and disengagement operation for the catching member 41, and stress concentration is likely to occur in the engagement guide region 52. The engagement guide region 52 reinforced by the extension region 53 to have sufficient rigidity can effectively prevent such plastic deformation in the engageable portion 51 due to stress concentration.

Particularly, in the vehicle hook structure designed such that the link member 5 is formed in a sectionally angular C shape having an opening in one side surface thereof, and the extension region 53 of the engageable portion 51 is disposed to cover the open surface (lower surface) of the link member 5, as in the second embodiment, the link member 5 can be effectively reinforced by the extension region 53 of the engageable portion 51. This makes it possible to adequately ensure the rigidity of the link member 5 without increase in weight of the link member 5, so as to allow the link member 5 to stably support the rear end of the hood 1.

Further, in the vehicle hook structure designed such that the extension region formed as the inclined surface extending frontward is formed in the engageable portion 51, as in the second embodiment, the engagement guide region 52 can be further effectively reinforced. This makes it possible to more effectively prevent plastic deformation in the engageable portion 51 which is likely to occur when die hook portion 48 of the catching member 41 is engaged and disengaged with and from the engagement guide region 52 of the engageable portion 51. Further, when the catching member 41 is separated from the engageable portion 51 according to the biasing force of the push-up drive device 31, the inclined surface 52a can be used as an engagement guide surface for guiding a tip end (hook portion 48) of the catching member 41 along the engagement guide region 52 in an engagement release direction to release the engagement between the catching member 41 and the engageable member 51 with a relatively small force and readily move the rear end of the hood 1 to a lifted position as shown in FIG. 18.

In the second embodiment, the link member 5 is coupled to the hood 1 through the hood-side bracket 7 fixed to the hood 1, and the anchor base portion 46 of the catching member 41 is sandwiched between the hood 1 (hood inner panel 1a) and the hood-side bracket 7. This makes it possible to adequately ensure the mounting rigidity of the catching member 41 so as to effectively prevent the engagement state of the catching member 41 from being undesirably released due to loads acting during the operation of opening and closing the hood 1.

Specifically, as shown in FIG. 17, during the operation of opening and closing the hood 1, a moment load is applied in a direction allowing the downward-extending portion 47 and the hoop portion 48 of the catching member 41 to be displaced about the second pivot member 15 and brought into press contact with a rear end (engagement guide region 52) of the engageable portion 52, and correspondingly a reaction force F pushing the rear end (downward-extending portion 47 and hoop portion 48) of the catching member 41 rearward is generated. As described above, the anchor base portion 46 of the catching member 41 is sandwiched between the hood 1 and the hood-side bracket 7. This structure can effectively prevent a mounting position of the catching member 41 from being displaced rearward. Thus, even if the hood 1 is repeatedly opened and closed, the structure makes it possible to reliably prevent the occurrence of an undesirable situation where the catching member 41 cannot be adequately engaged with the engageable portion 51 due to displacement of an engagement position therebetween.

In the second embodiment, in place of the push-up drive device 31 located in the vehicle body and designed to drive the hood 1 in a direction allowing the rear end of the hood 1 to be forcibly pushed upward, the push-up drive device may be designed to automatically lift the rear end of the hood 1 according to a reaction force from an impact load acting during collision so as to separate the hook portion 48 of the catching member 41 from the engagement guide region 52 of the engageable portion 51. However, in the structure as described in the second embodiment designed such that, in the event of a collision between the front end of the vehicle body and an obstacle, the push-up drive device 31 is activated to bias the link member 5 upward, while maintaining the coupled state between the respective front ends of the link member 5 and the hood-side bracket 7 by the second pivot member 15, so as to allow the catching member 41 to be separated from the engageable portion 51, the coupled state between the intermediate portion of the link member 5 and the rear end of the hood-side bracket 7 can be released readily and adequately.

Alternatively, the push-up drive device 31 may be designed to push the anchor base 9 of the hood-side bracket 7 or the hood 1 upward to separate the hook portion 48 of the catching member 41 from the engagement guide region 52 of the engageable portion 51. Further, in place of the structure as described in the second embodiment where the respective front ends of the link member 5 and the hood-side bracket 7 are rotatably coupled to each other through the second pivot member 15 composed of the coupling pin, the structure for rotatably coupling the front end of the link member 5 to the front end of the hood-side bracket 7 may be constructed using as the second pivot member any other suitable type of pivot, for example, designed such that a protrusion formed in either one of the front end of the link member 5 and the hood-side bracket 7 may be fitted into a depression formed in the remaining one of them.

Figure 19:
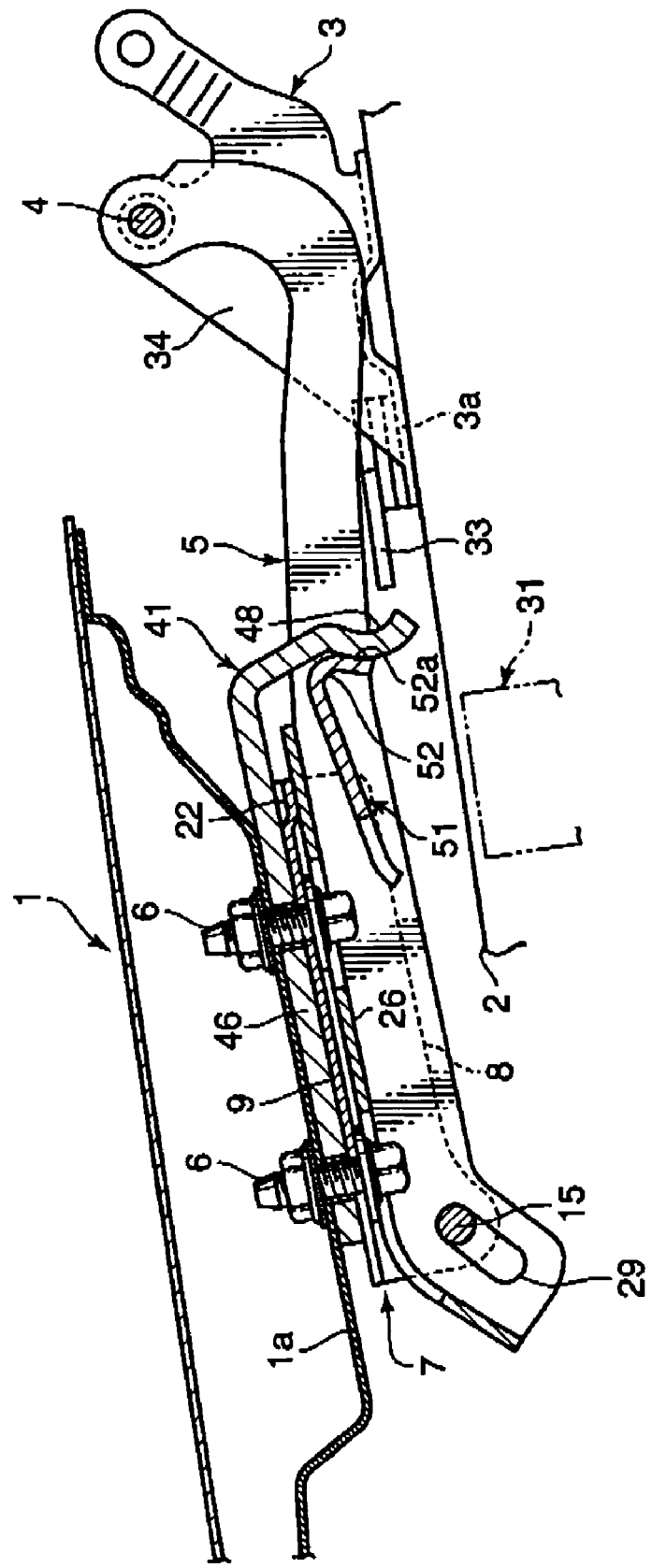
FIG. 19 is a sectional side view showing a vehicle hood structure according to a third embodiment of the present invention.
Figure 20:
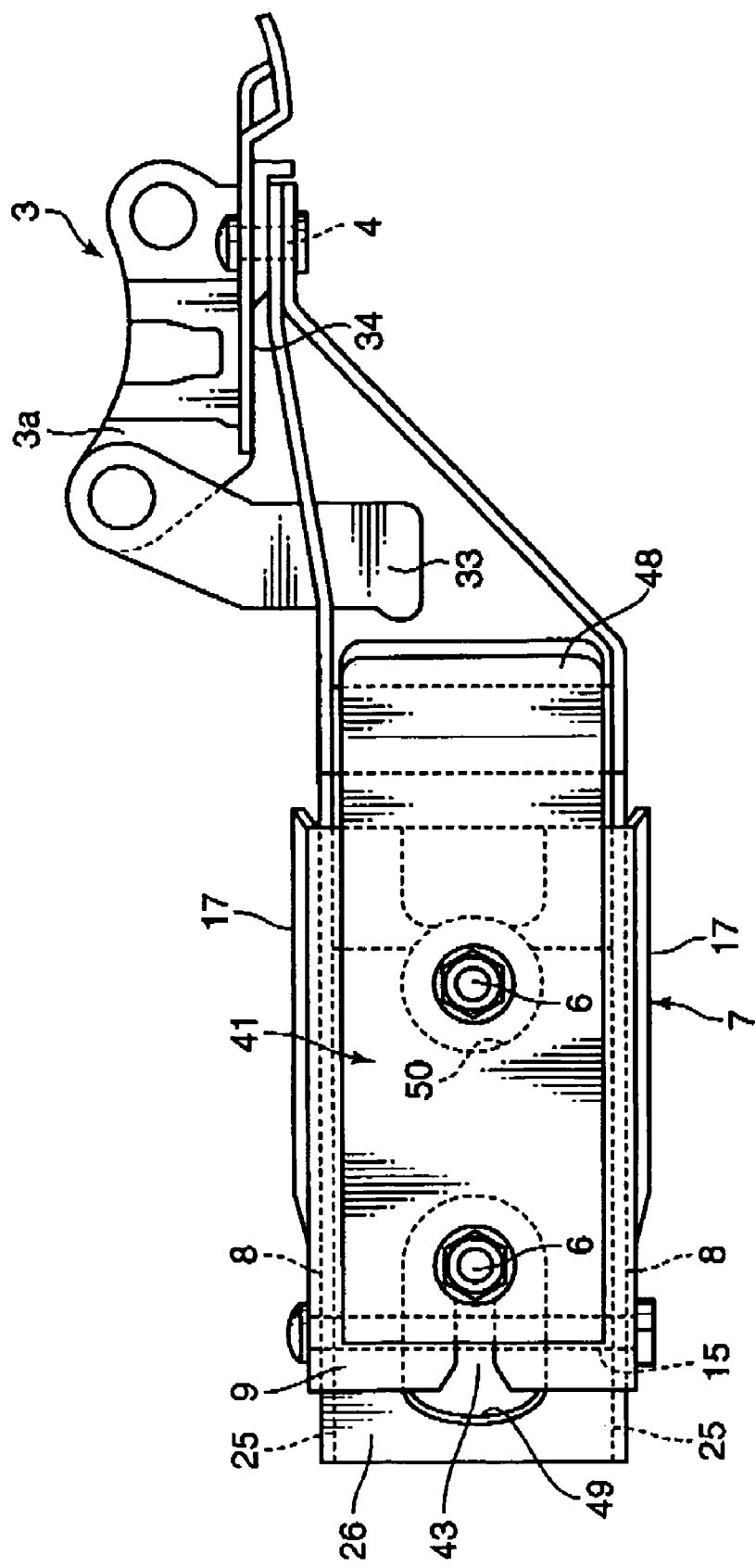
FIG. 20 is a top plan view showing the structure of a support mechanism for supporting a rear end of a hood, in the vehicle hood structure according to the third embodiment.

Further, a stopper member for restricting a rearward displacement of a locking protrusion consisting of the hook portion 48 of the catching member 41 may be provided in the vehicle body. For example, as shown in a third embodiment illustrated in FIGS. 19 and 20, a stopper member 33 may be disposed at a position opposed to the hook portion 48 of the catching member 41 on a rearward side of the catching member 41, and integrally fixed onto a top surface of a front end of an anchor base 3a of the hinge bracket 3 with a mounting bolt (not shown), to restrict the catching member 41 from being displaced rearward. In this structure, even if the hood 1 is moved rearward due to an impact load acting during a collision between the vehicle body and a forward obstacle, a rearward movement of the hood 1 can be restricted at a time when the catching member 41 comes into contact with the stopper member 33, so as to prevent the occurrence of an undesirable situation where the hood 1 comes into contact with a front windshield to cause breakage of the front windshield, in a simplified structure.

Further, in the third embodiment, an upright plate 34 serving as a mounting portion of the first pivot member 4 is provided in the hinge bracket 3, and the stopper member 33 is disposed in front of the upright plate 34 with a given distance. Thus, during a period where an impact load is relatively small in the event of a front-impact collision, a rearward movement of the hood 1 can be restricted at a time when the locking protrusion consisting of the hook portion 48 comes into contact with the stopper member 33, to sufficiently absorb the impact load. Then, when the impact load acting to move the hood 2 rearward is increased to a given value or more, the stopper member 33 is pushed by the locking protrusion, and displaced rearward. Thus, the stopper member 33 comes into contact with the upright plate 34 to restrict the hood 1 and the stopper member 33 from being further displaced rearward. In this manner, the impact load can be advantageously absorbed stepwise.

As with the aforementioned embodiments, in the third embodiment, in the event of a collision between the front end of the vehicle body and an obstacle, the push-up drive device 31 is activated to bias the link member 5 upward, while maintaining the coupled state between the respective front ends of the link member 5 and the hood-side bracket 7 by the second pivot member 15, so as to allow the catching member 41 to be separated from the engageable portion 51. Thus, the coupled state between the intermediate portion of the link member 5 and the rear end of the hood-side bracket 7 can be released readily and adequately.

FIGS. 21 to 26 show a vehicle hood structure according to a fourth embodiment of the present invention. In the fourth embodiment, each of right and left side walls 8 of a hood-side bracket 7 has a rear end formed with a guide groove portion 61 including a guide groove consisting of a notched groove extending rearward and downward. The guide groove of the guide groove portion 61 has an opening oriented in a rearward direction, and a fan or trumpet-like shape having a width which increases toward the opening (rear end). The guide groove portion 61 also includes a protrusion 62 formed at an open end of the guide groove, and a locking finger 63 at a lower end of the protrusion 62. The protrusion 62 protrudes downward, and the locking finger 63 protrudes rearward.

Further, each of right and left side walls 25 of a link member 5 has a longitudinally central portion formed with a lock hole 65 for locking a lockable member 64 consisting of a lock pin disposed to extend laterally or in a width direction of the vehicle body. That is, this vehicle hood structure is designed such that a restricted element consisting of the lockable member 64 supported by the side walls 25 through the lock holes 65 is unlockably locked by a restricting element consisting of the guide groove portion 61 of the hood-side bracket 7.

A hinge bracket 3 includes an anchor base 3a fixed to the front fender 2, and an upright plate 34 extending upright from an inward edge of the anchor base 3a The upright plate 34 is formed with a mounting hole 35 for a first pivot member 4 composed, for example, of a hinge pin extending laterally. A stopper member 33 is attached to a top surface of a front end of the anchor base 3a at a position opposed to a rear surface of the protrusion 62 formed in each of the side walls 8 of the hood-side bracket 7, and fixed to a member (front fender 2) of the vehicle body together with the anchor base 3a by use of a mounting bolt (not shown). Thus, a rearward movement of the protrusions 62 of the hood-side bracket 7 is restricted by the stopper member 33.

In a normal state, the lockable member 64 attached to the central portion of the link member 5 is locked in a front end position (restriction position) of the guide groove portion 61 of the hinge-side bracket 7 to integrally couple the intermediate portion of the link member 5 to the rear end of the hood 1, and the respective front ends of the link member 5 and the hood-side bracket 7 are integrally coupled to each other through a second pivot member 15. In this state, the hood 1 can be opened and closed about the first pivot member located in the hinge bracket 3.

Figure 21:
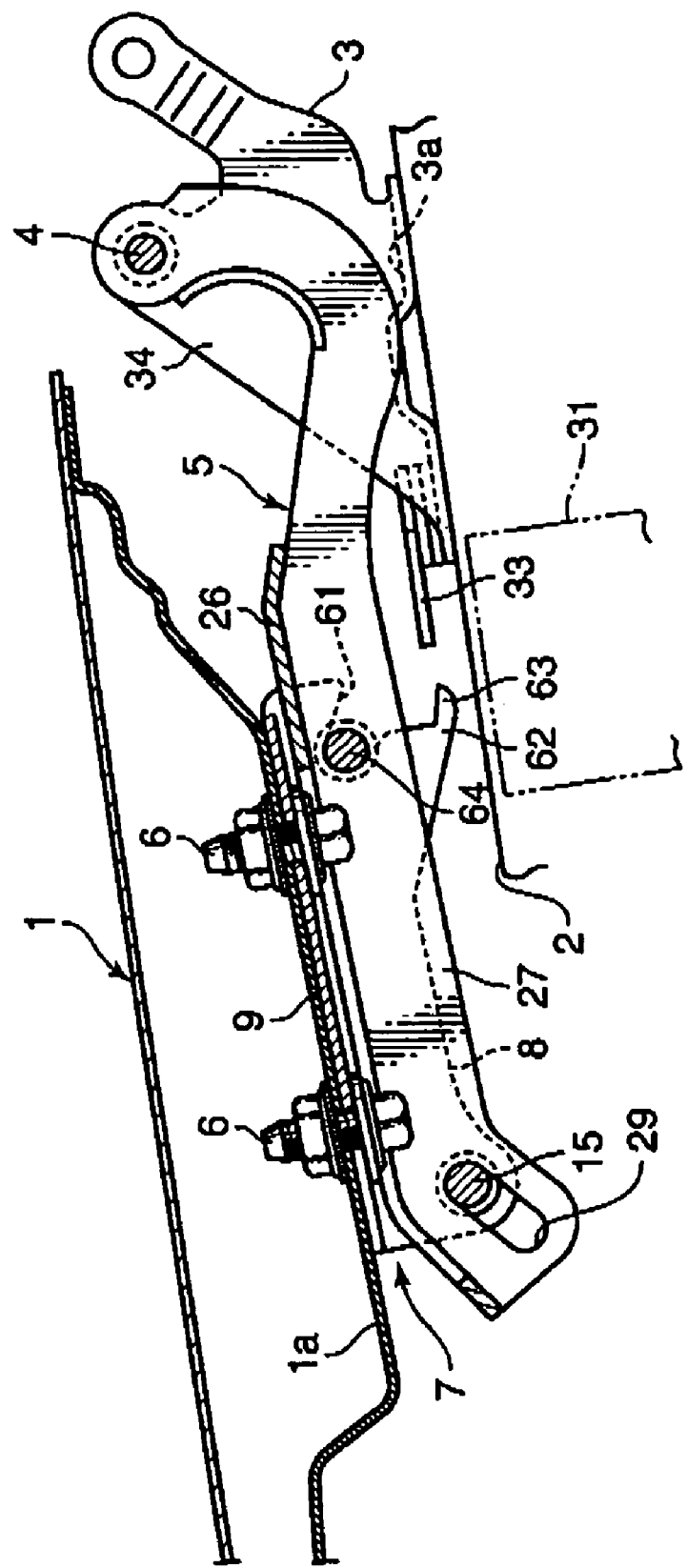
FIG. 21 is a sectional side view showing a vehicle hood structure according to a fourth embodiment of the present invention.
Figure 22:
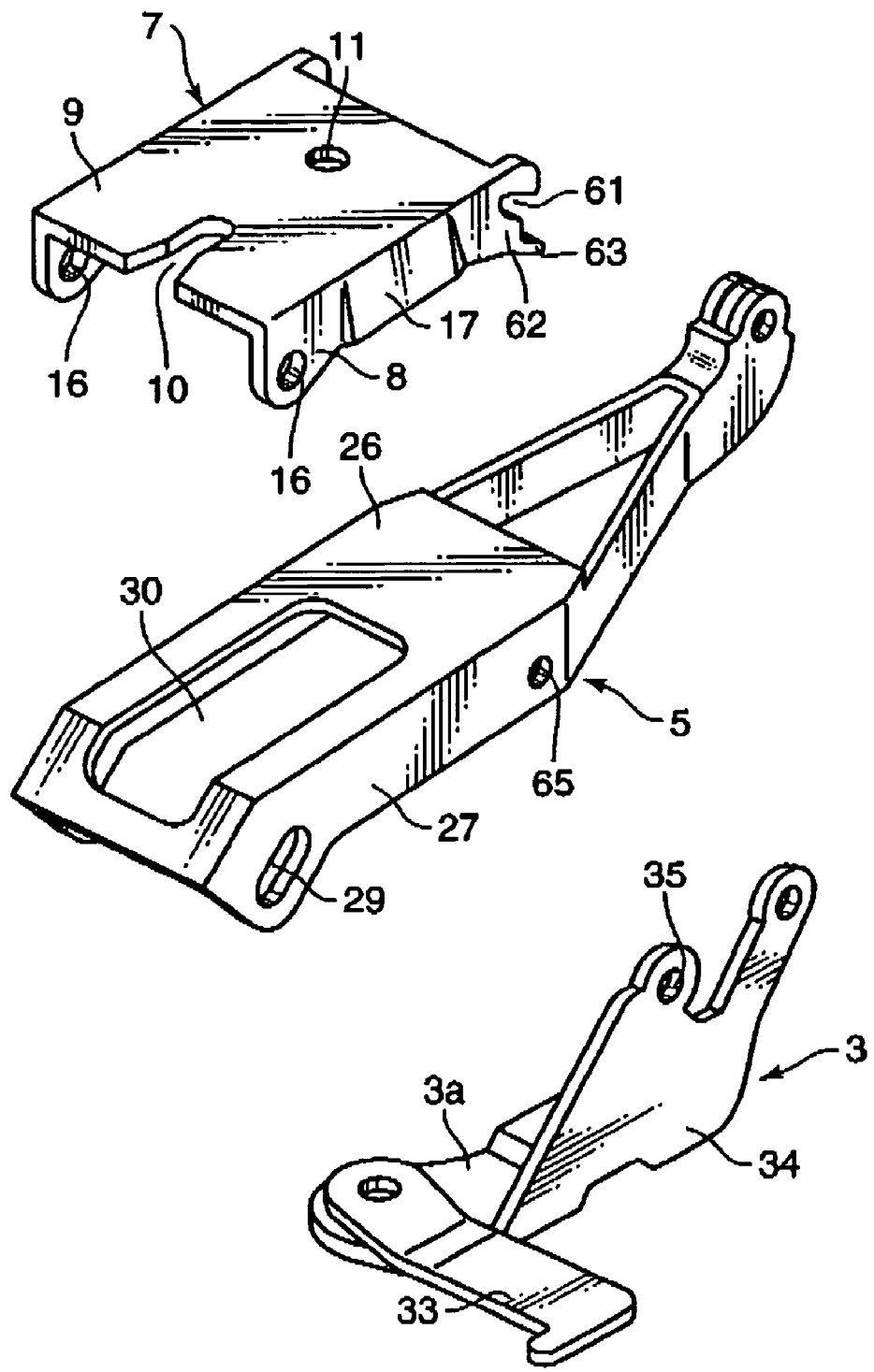
FIG. 22 is an exploded perspective view showing the structure of a support mechanism for supporting a rear end of a hood, in the vehicle hood structure according to the fourth embodiment.
Figure 23:
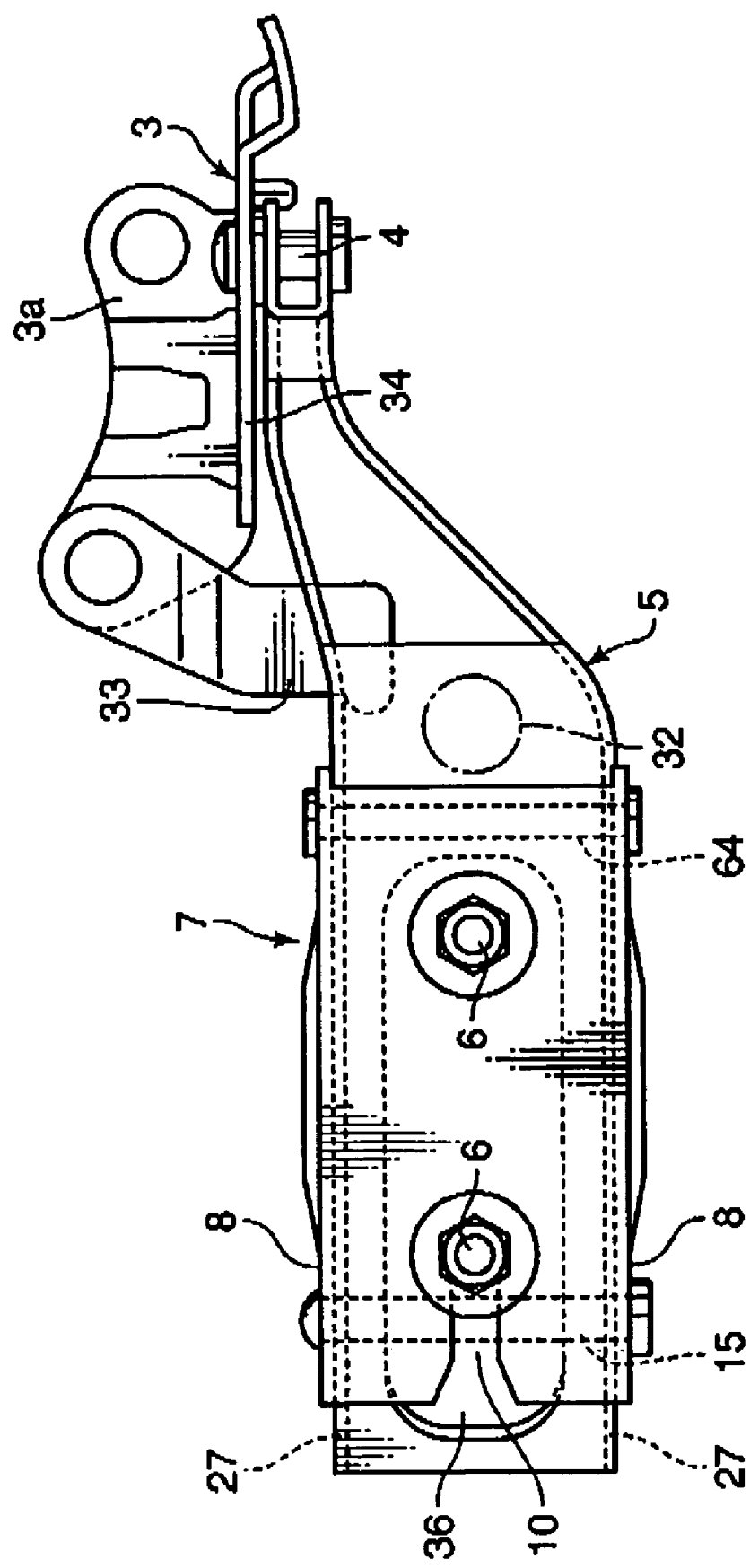
FIG. 23 is a top plan view of the structure of the support mechanism in FIG. 22.
Figure 24:
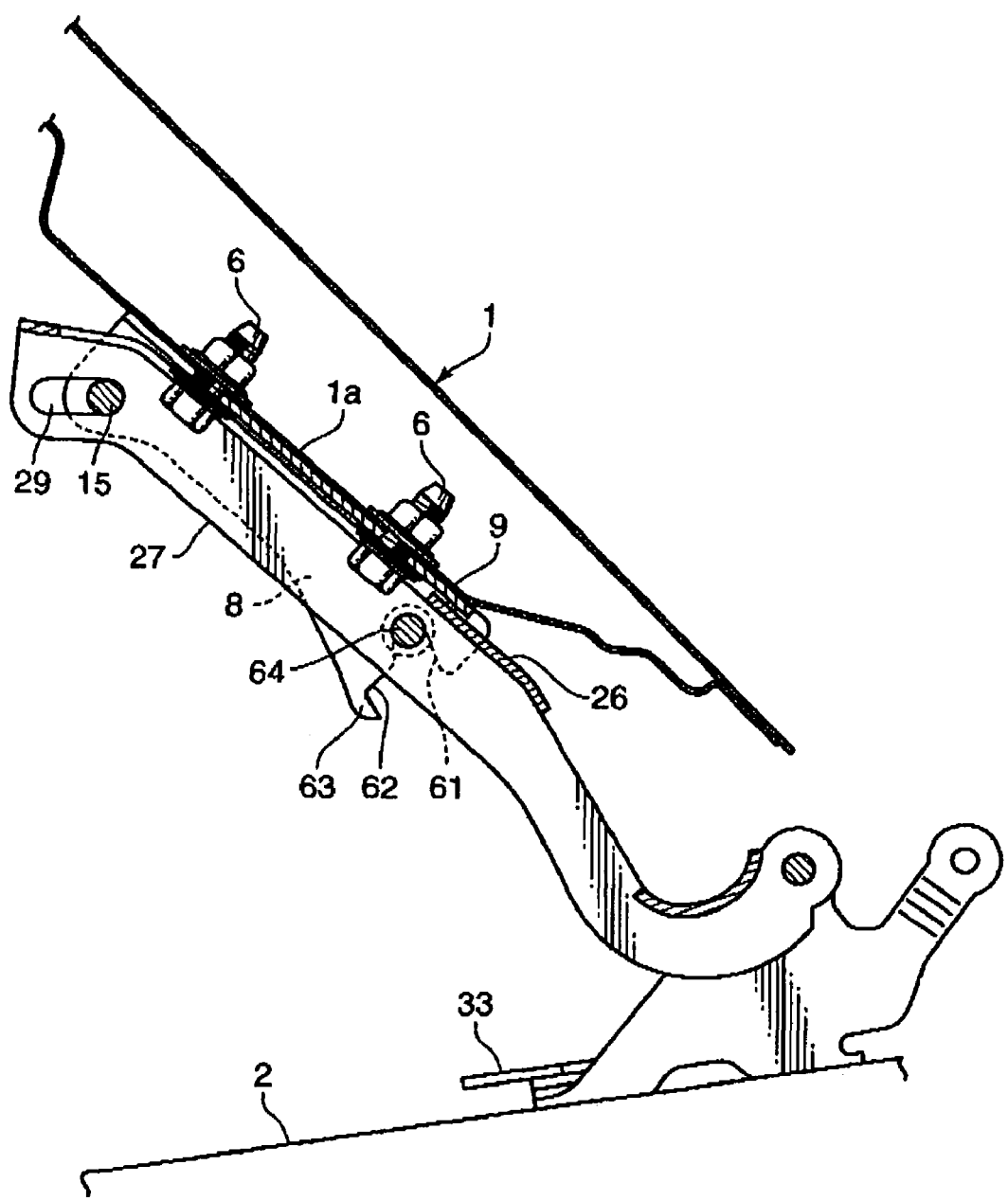
FIG. 24 is a sectional side view showing the vehicle hood structure in FIG. 21 in a full open state of the hood.

Thus, in the condition where a restriction mechanism consisting of the lockable member 64 and the guide groove portion 51 restricts the link member 5 from being separated away from the hood 1 about the second pivot member 15, a locked state of the hood 1 based on a lock mechanism (not shown) provided at a front end of the hood is released, and then the front end of the hood 1 in a full closed position as shown in FIG. 21 is lifted upward. Though this operation, the front end of the link member 5 can be swingingly displaced upward about the first pivot member 4 to move the hood 1 to a full open position, as shown in FIG. 24. Further, in the condition where the rear end of the hood 1 and the link member 5 are integrally coupled to each other, the hood 1 can be locked at the restriction position to stably lock the hood 1 in the locked state while preventing the rear end of the hood 1 from being moved up and down during running of the vehicle.

When a sensor (not shown) detects that the front end of the vehicle body comes into contact with an obstacle during running of the vehicle, an inflator or the like of a push-up drive device 31 disposed below the link member 5 is activated to extend an extendable push rod 32 so as to bias a top wall 26 of the link member upward. Thus, the front end of the link member 5 is pushed upward about the first pivot member 4, and the rear end of the hood 1 is pushed upward about the lock at the front end of the vehicle body. Through this movement, the lockable member 64 fixed to the link member 5 is slidingly displaced toward the open end (rearward) along the guide groove of the guide groove portion 61. Thus, the lockable member 64 is separated from the guide groove portion 61 so as to permit the link member 5 to be swingingly displaced about the second pivot member 15 in a direction away from the hood 1.

Figure 25:
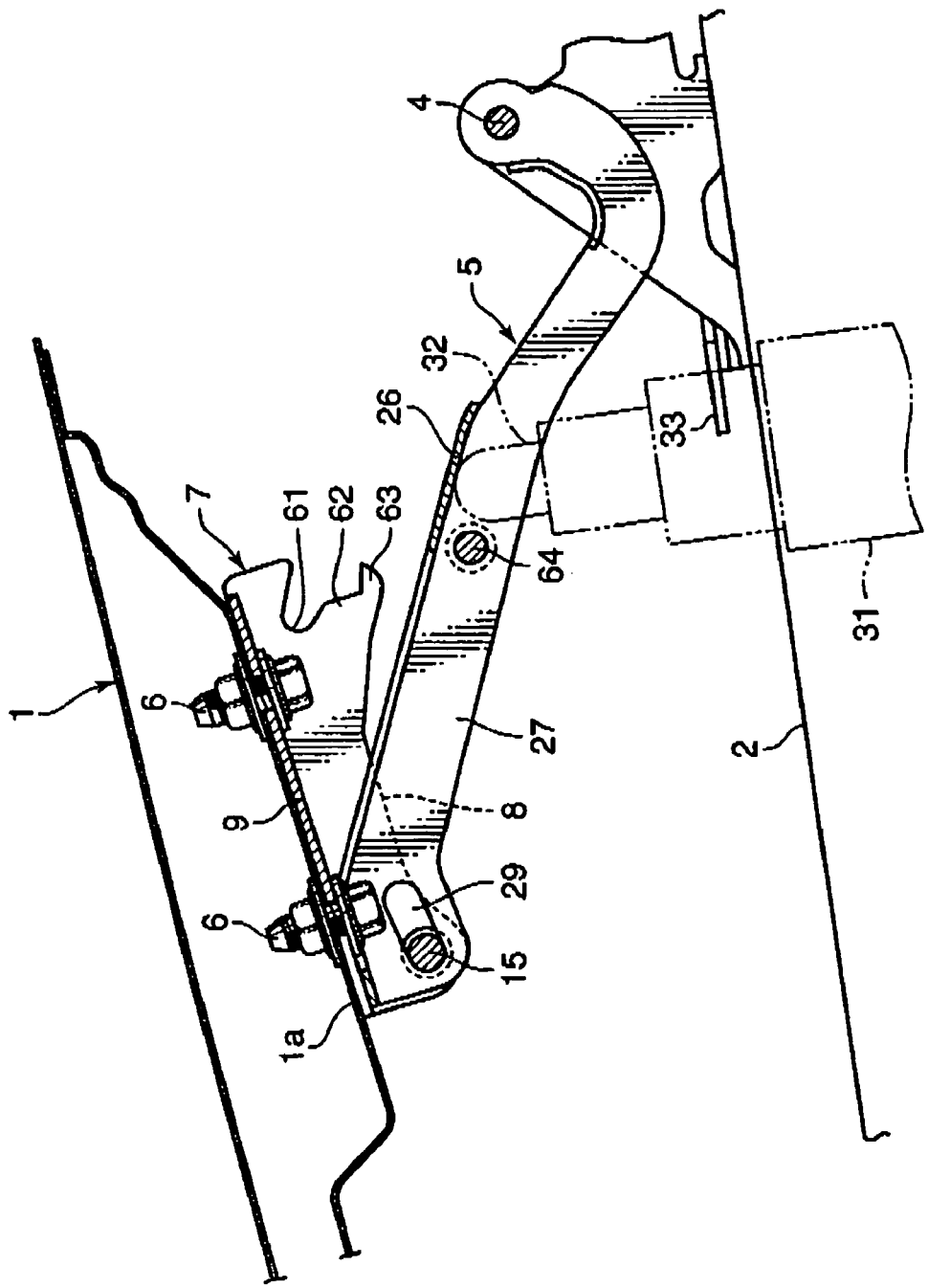
FIG. 25 is a sectional side view showing the vehicle hood structure in FIG. 21 in a state after the rear end of the hood is lifted.

As above, according to the biasing force of the push-up drive device 31, the link member 5 is allowed to be swingingly displaced about the first pivot member 4 in the condition where the front end of the hood 1 is locked in the full closed position by the lock mechanism. Thus, as shown in FIG. 25, the rear end of the hood 1 is pushed upward. Further, the second pivot member 15 is slidingly displaced frontward along a guide slot 29 (elongated hole) of the link member 5, and the link member 5 is swingingly displaced about the first pivot member 4, so that the front end of the link member 5 is moved upward up to a given position.

Subsequently, when the rear end of the hood 1 lifted by the push-up drive device 31 is pushed downward, the rear end of the hood 1 is moved downward while being supported by the link member 5 whose front end is coupled to the front end of the hood-side bracket 7 through the second pivot member 15. In conjunction with this movement, the link member 5 is swingingly displaced about the first pivot member 4, and the front end of the link member 5 is moved downward to the initial position as shown in FIG. 21. When the hood 1 and the link member 5 are moved downward to their initial positions, the lockable member 64 is introduced from the open end of the guide groove portion 61 into the guide groove of the guide groove portion 61, and guided frontward and upward. Thus, the link member 5 is integrally coupled to the rear end of the hood 1 through the restriction mechanism comprising the lockable member 64 and guide groove portion 61, or returned to the initial state.

As mentioned above, this vehicle hood structure comprising the hood 1 disposed in a front region of the vehicle body and supported by the vehicle body in an openable and closable manner is provided with the link member 5 swingably supported in a pivoted manner by the first pivot member 4 located on the vehicle body, and designed to restrict the link member 5 from being swingingly displaced in a direction away from the hood 1 by a restriction mechanism which includes a restricted element consisting of the lockable member 64 located in the link member 5, and a restricting element consisting of the guide groove portion 61 located in the hood-side bracket 7. Thus, in a normal state, the rear end of the hood 1 is coupled to the link member 5, so that the hood 1 can be smoothly opened and closed about the first pivot portion 4 located in the hinge bracket 3. Further, during running of the vehicle, the hood 1 can be stably kept in the locked state while preventing the rear end of the hood 1 from being moved up and down.

In the event of a collision between the front end of the vehicle body and an obstacle, the push-up drive device 31 is activated to bias the link member 5 upward, so that the lockable member 64 can be separated from the guide groove portion 61 to release the coupled state between the link member 5 and the hood-side bracket 7. Therefore, as shown in FIG. 25, the rear end of the hood 1 can be moved upward according to the biasing force of the push-up drive device 31 to sufficiently ensure a downward stroke of the hood 1, for example, when the above obstacle falls onto the hood 1, and deform the hood 1 so as to effectively reduce an impact load to be applied to the obstacle.

Further, after the occurrence of the impact collision, the rear end of the hood 1 lifted as described above is pushed downward to move the hood 1 and the link member 5 downward to their initial position, so that the lockable member 64 can be slidingly displaced frontward and upward or to the restriction position, along the guide groove of the guide groove portion 61. This makes it possible to readily return to the initial state without any complicated operation, such as an operation of coupling the link member 5 and the hood-side bracket 7 together using a new coupling member. Thus, when the hood 1 is returned to the initial position to run the vehicle again after the rear end of the hood 1 is lifted according to activation of the push-up drive device 31 during the above collision or due to malfunction of the push-up drive device 31, the hood 1 can be stably kept in the locked state while restricting the rear end of the hood 1 from being moved up and down by the restriction mechanism, to effectively prevent the occurrence of a wobbling movement of the hood 1 during running of the vehicle, in a simplified structure.

In the fourth embodiment, the guide groove portion 61 includes the guide groove having an opening at one end thereof, and the lockable member 64 is designed to be locked and unlocked into and from the guide groove through the open end. Thus, based on the restriction mechanism including the lockable member 64 and the guide groove portion 61, the lockable member 64 can be readily displaced between a first position for restricting the link member 5 from being swingingly displaced in the direction away from the hood 1 and a second position for releasing the restriction, in a simple and compact structure.

Specifically, the guide groove portion may be formed to have an elongated hole extending from the restriction position as shown in FIG. 21 to a non-restriction position as shown in FIG. 25, and designed such that the lockable member 64 is slidingly displaced along the guide groove (elongated hole) between to a first position for restricting the link member 5 from being swingingly displaced in the direction away from the hood 1 and a second position for releasing the restriction. In this case, the hood-side bracket 7 formed with the guide groove portion having the elongated hole is inevitably required to be increased in size. In contrast, the structure where the guide groove portion 61 includes the guide groove having an opening at one end thereof, and allows the lockable member 64 to be locked and unlocked into and from the guide groove through the open end, the lockable member 64 can be readily moved between the restriction position where the lockable member 64 is locked at the front end of the guide groove, and the non-restriction position where the lockable member 61 is out of the guide groove, while preventing an increase in size of the hood-side bracket 7 formed with the guide groove portion 61. In the fourth embodiment, a concave groove having an opening oriented in an outward direction of the vehicle body may be formed instead of the notched groove of the guide groove portion 61, and a lateral end of a lock pin extending laterally to serve as the lockable member 64 may be unlockably locked in the concave groove.

In the fourth embodiment, the guide groove of the guide groove portion 61 has a width which increases toward the open end. In this case, the lockable member 64 can be slidingly displaced to the restriction position (frontward and upward position) of the guide groove portion 61 to stably lock the lockable member 64 in the rear end of the hood-side bracket 7 while preventing a wobbling movement of the lockable member 64. In addition, when the lockable member 64 is moved from the non-restriction position illustrated in FIG. 25 to the restriction position illustrated in FIG. 21, the lockable member 64 can be smoothly introduced into the guide groove portion 61.

In the fourth embodiment, the link member has one end (anchor end) pivotally supported by the vehicle body through the first pivot member 4 and the other end (front end) pivotally supported by the hood 1 (specifically hood-side bracket 7), and the restriction mechanism restricts the link member 5 from being swingingly displaced about the second pivot member 15 and separated away from the hood 1. This makes it possible to, in the event of the collision, adequately release the coupled state between the intermediate portion of the link member 5 and the rear end of the hood-side bracket 7, and, after release of the coupled state, facilitate the operation of returning the intermediate portion of the link member 5 and the rear end of the hood-side bracket 7 to their initial positions.

In the fourth embodiment, the guide slots each consisting of an elongated hole extending frontward and downward are formed in the link member 5, and the second pivot member 15 consisting of a coupling pin and extending laterally is located on the side of the hood 1 and supported by the guide slots 29 slidably along the guide slots 29. Thus, when the rear end of the hood 1 is lifted upward according to the biasing force of the push-up drive device 31, the second pivot member 15 can be slidingly displaced along the guide slots 29 to smoothly perform the operation of swingingly displacing the hood 1 about the front end thereof so as to move the rear end of the hood 1 upward, and swingingly displacing the link member 5 about the first pivot member 4 so as to move the front end of the link member 5 upward. In addition, when the rear end of the hood 1 is moved downward from the lifted position to the initial position, a movement locus of the lockable member 64 can be stabilized to reliably introduce the lockable member 64 into the guide groove portion 61.

In the fourth embodiment, the guide groove portion 61 formed in the hood-side bracket 7 includes a locking protrusion consisting of the protrusions 62 protruding downward, and the stopper member 33 for restricting the locking protrusions 62 from being displaced rearward is located on the side of the vehicle body.

Thus, even if the hood 1 is moved rearward due to an impact load acting during a front-impact collision, a rearward movement of the hood 1 can be restricted at a time when the protrusions 62 comes into contact with the stopper member 33, so as to prevent the occurrence of an undesirable situation where the hood 1 comes into contact with a front windshield to cause breakage of the front windshield, in a simplified structure. Particularly, in the fourth embodiment, the locking fingers 63 protruding rearward are formed at the respective lower ends of the protrusions 62. Thus, the locking fingers 63 makes it possible to, in the event of the front-impact collision, restrict the protrusions 62 from being moved upward by the stopper member 33, so as to reliably prevent occurrence of an undesirable lift of the rear end of the hood 1.

In the fourth embodiment, in place of the push-up drive device 31 designed to drive the hood 1 in a direction allowing the rear end of the hood 1 to be forcibly pushed upward, the push-up drive device may be designed to automatically lift the rear end of the hood 1 according to a reaction force from an impact load acting during collision so as to separate the lockable member 64 from the restriction position of the guide groove portion 61. However, in the structure as described in the fourth embodiment designed such that, in the event of a collision between the front end of the vehicle body and an obstacle, the push-up drive device 31 is activated to bias the link member 5 upward so as to allow the lockable member 64 to be separated from the restriction position of the guide groove portion 61, the coupled state between the link member 5 and the hood-side bracket 7 can be released readily and adequately.

Figure 26:
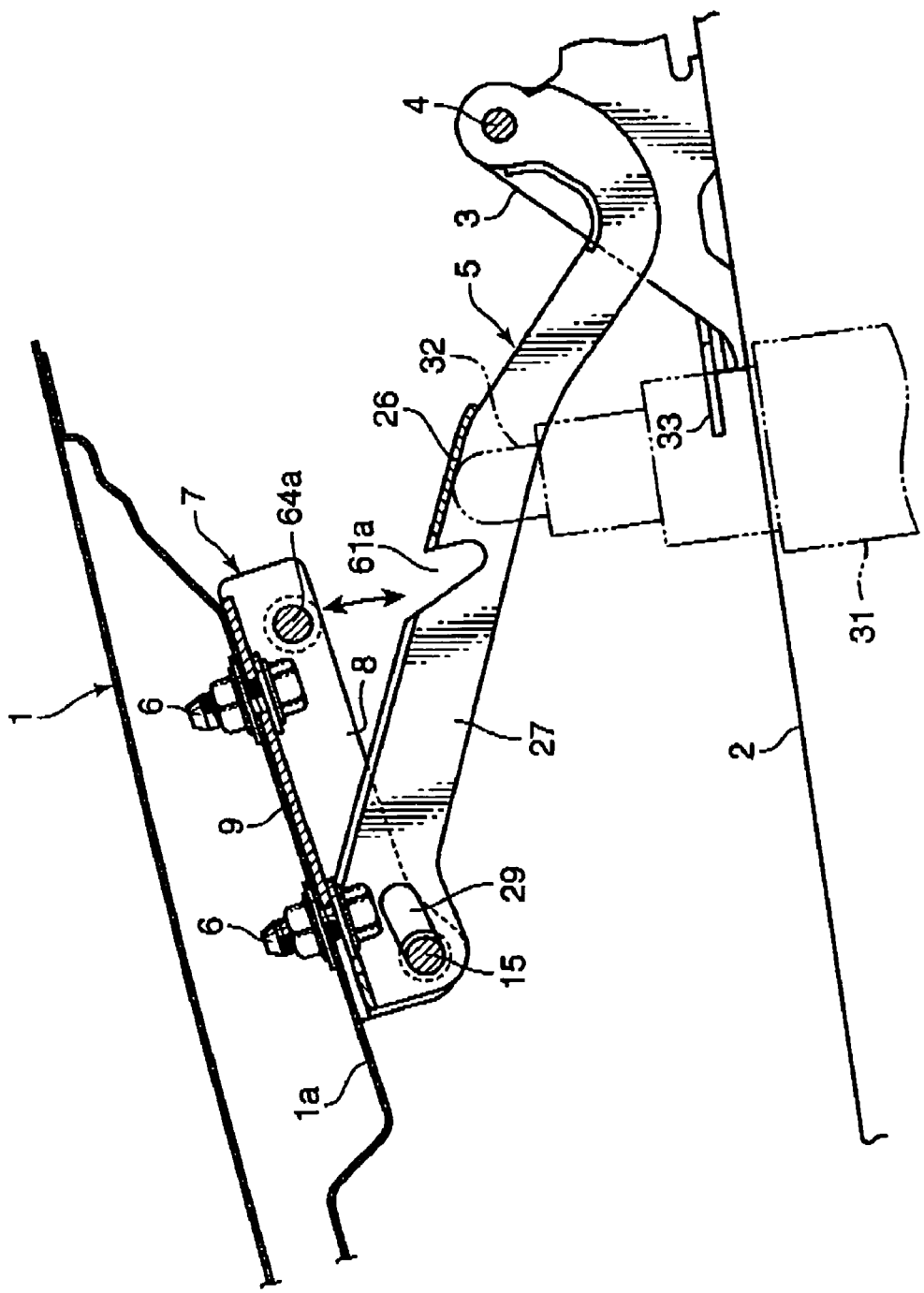
FIG. 26 is a sectional side view showing one example of modification of the vehicle hood structure according to the fourth embodiment.

Further, as shown in FIG. 26, the restriction mechanism for restricting the link member 5 from being separated away from the hood 1 may comprise a lockable member 64a located in the hood-side bracket 7 and composed, example, of a lock pin extending laterally, and a guide groove portion 61a formed in the link member 5 (e.g. side walls of the link member 5) and composed, for example, of a notched groove extending rearward and downward. In this case, it is preferable to provide a locking protrusion protruding downward to the lockable member 64a, and restrict a rearward displacement of the locking protrusion by the stopper member 33.

As described above, a vehicle hood structure is disposed in a front region of a vehicle body and supported in an openable and closable manner. The vehicle hood structure comprises a link member swingably supported in a pivoted manner by a pivot member located on the vehicle body, and a restriction mechanism adapted to couple the link member to a rear end of a hood so as to restrict the link member from being separated away from the hood. The restriction mechanism includes a restricting element located in either one of the link member and the hood, and a restricted element located in the remaining one of the link member and the hood.

According to the vehicle hood structure, in the event that a collision between a front end of the vehicle body and an obstacle, the restring element can be separated from the restricted element, for example, by biasing the link member upward, to release a coupled state between the link member and the hood so as to lift a rear end of the hood. Thus, an amount of downward displacement of the hood required, for example, when the above obstacle falls onto the hood can be sufficiently ensured to effectively absorb an impact load to be applied to the obstacle. Further, after the occurrence of the impact collision, the fixable portion of the press-fittable member can be fitted in the press-fittable-member receiving section while being deformable. This makes it possible to readily return to the initial state without any complicated operation, such as an operation of coupling the link member and the hood together using a new coupling member.

Preferably, the restriction mechanism may include a press-fittable member serving as the restricting element located in either one of the link member and the hood, and a press-fittable-member receiving section serving as the restricted element located in the remaining one of the link member and the hood. The press-fittable member may include a fixable portion adapted to be detachably fitted in the press-fittable-member receiving section while being displaced and deformably reduced in diameter.

Preferably, the restricting element may include a press-fittable member, and the restricted element includes a press-fittable-member receiving section adapted to receive the press-fittable member. The press-fittable member may include a fixable portion adapted to be detachably fitted in the press-fittable-member receiving section while being displaced and deformably reduced in diameter.

According to this vehicle hood structure, in the event that a collision between a front end of the vehicle body and an obstacle, the fixable portion of the press-fittable member can be separated from the press-fittable-member receiving section, for example, by biasing the link member upward, to release the coupled state between the link member and the hood. This makes it possible to effectively lift the rear end of the hood and readily return to the initial state.

In the above vehicle hood structure, the link member may have one end pivotally supported by the vehicle body through a first pivot member, and the other end pivotally supported by the hood through a second pivot member, and the restriction mechanism may be designed to restrict the link member from being swingingly displaced about the second pivot member and separated away from the hood.

In the above vehicle hood structure, the pivot member may include a first pivot member pivotally supporting one of opposite ends of the link member relative to the vehicle body. Further, the hood may include a second pivot member pivotally supporting the other end of the link member, and the restriction mechanism may be designed to restrict the link member from being swingingly displaced about the second pivot member and separated away from the hood.

According to this vehicle hood structure, in the event that an impact collision, the hood can be swingingly displaced about the second pivot member to separate the rear end of the hood away from the link member so as to smoothly separate the fixable portion of the press-fittable member from the press-fittable-member receiving section. In addition, the coupled state between the hood and the link member can be maintained by the second pivot member to prevent jumping-up of the hood during running of the vehicle. In addition, after release of the coupled state, the rear end of the lifted hood can be pushed downward to swingingly displace the hood about the second pivot member so as to move the rear end of the hood downward, and swingingly displace the link member about the first pivot member so as to move a front rear end of the link member downward, automatically. Thus, the fixable portion can be fitted in the press-fittable-member receiving section to integrally couple the link member to a hood-side bracket, only by pushing the rear end of the hood downward, without any complicated operation, such as an operation of coupling the link member and the hood together while positioning them.

In the above vehicle hood structure, preferably, the fixable portion may have a tip end formed with a tapered surface narrowed toward a tip thereof to serve as an engagement guide region for guiding engagement with the press-fittable-member receiving section.

According to this vehicle hood structure, when the fixable portion is press-fitted in the press-fittable-member receiving section while being displaced and deformably reduced in diameter during the course of the operation of pushing the rear end of the hood downward, the tapered surface of the engagement guide region can be used as a guide surface to perform the press-fitting operation for the fixable portion readily and adequately.

In the above vehicle hood structure, the fixable portion may have an engagement holding region formed of a tapered surface inclined in a direction opposite to an inclination of the engagement guide region, on the side of a base end of the engagement guide region formed of the tapered surface in the tip end of the fixable portion.

In the above vehicle hood structure, the fixable portion may have an anchor end formed with a tapered surface inclined in a direction opposite to an inclination of the engagement guide region to serve as an engagement holding region for holding the engagement with the press-fittable-member receiving section.

According to this vehicle hood structure, when the fixable portion fitted in the press-fittable-member receiving section is separated from the press-fittable-member receiving section to release the coupled state between the rear end of the hood and the link member, the taper surface of the engagement holding region can be used as a guide surface to separate the fixable portion from the press-fittable-member receiving section readily and adequately.

In the vehicle hood structure, the tapered surface for the engagement guide region may have an inclination angle less than that of the tapered surface for the engagement holding region.

According to this vehicle hood structure, in the fixable portion of the press-fittable-member, the inclination angle of the tapered surface for the engagement guide region is set to be less than that of the tapered surface for the engagement holding region, so that the engagement guide region has a more acute-angled tapered shape than the engagement holding region. Thus, in an operation of pushing the rear end of the hood downward to press-fit the fixable portion into the press-fittable-member receiving section, the tapered surface of the engagement guide region can sufficiently exert a guiding function to allow the fixable portion of the press-fittable member to be smoothly fit into the press-fittable member receiving section. In addition, the inclination angle of the tapered surface of the engagement holding region set to be greater than the inclination angle of the tapered surface of the engagement guide region makes it possible to prevent the fixable portion from being separated from the press-fittable member receiving section in the normal state so as to stably hold the press-fittable member in a fitted position, while maintaining the guide function when the fixable portion is separated from the press-fittable member receiving section.

In the above vehicle hood structure, preferably, the press-fittable member may comprise a core having a diameter less than that of the press-fittable-member receiving section, and an elastic body covering the core to serve as the fixable portion.

According to this vehicle hood structure, the press-fittable member comprises the core made of a high-rigidity material, and the fixable portion formed of an elastic body to cover the core, and the outer diameter of the shaft-shaped core is set to be less than the inner diameter of the press-fittable-member receiving section. Thus, the press-fittable member can be stably fitted into the press-fittable-member receiving section. Further, in an operation of separating the fixable portion from the press-fittable-member receiving section to release the coupled state between the rear end of the hood and the link member, the core can prevent the press-fittable member from being excessively deformed even if a certain bending or torsion force is applied to the press-fittable member. This makes it possible to adequately separate the fixable portion from the press-fittable-member receiving section according to need, without occurrence of an undesirable situation, for example, where the fixable portion cannot be separated from the pressfittable-member receiving section, or the fixable portion is damaged, due to excessive deformation in the fixable portion.

In the vehicle hood structure, the link member may have an anchor end rotatably supported in a pivoted manner by a first pivot member located on the vehicle body, and a front end rotatably supported in a pivoted manner by a second pivot member located on the hood. Further, the restriction mechanism may comprise a catching member supported by the hood in a cantilevered manner to serve as the restricting element, and an engageable portion located in the link member and adapted to be disengageably engaged with the catching member to serve as the restricted element.

In the vehicle hood structure, the pivot member may include a first pivot member swingably supporting an anchor end of the link member relative to the vehicle body. The link member may have a front end rotatably supported in a pivoted manner by a second pivot member located on the hood, and the restricting element may include a catching member supported by the hood in a cantilevered manner. Further, the restricted element may include an engageable portion located in the link member and adapted to be disengageably engaged with the catching member.

According to this vehicle hood structure, in the event of a collision between the front end of the vehicle and an obstacle, the catching member can be separated from the engageable portion to move the rear end of the hood upward, while maintaining the coupled state between respective front ends of the link member and a hood-side bracket by the second pivot member. This makes it possible to sufficiently ensure a downward stroke of the hood, for example, when the above obstacle falls onto the hood, and deform the hood so as to effectively reduce an impact load to be applied to the obstacle. Then, after the occurrence of the impact collision, the rear end of the hood lifted as described above can be pushed downward to move the hood and the link member downward to their initial position while swingingly displacing the link member about the first pivot member, and rotatably displacing the link member about the second pivot member in a direction coming closer to a bottom surface of the rear end of the hood, so that the catching member supported by the hood in a cantilevered manner can be elastically deformed and re-engaged with the engageable portion. This makes it possible to readily return to the initial state without any complicated operation, such as an operation of coupling the link member and the hood-side bracket together using a new coupling member.

In the above vehicle hood structure, the catching member may have a free end formed as a hook portion, and the engageable portion may have an engagement guide region for guiding the catching member in a direction allowing the hook portion to be expanded.

According to this vehicle hood structure, in an operation of moving the hood downward to its initial position after an impact collision, the engagement guide region of the engageable portion can guide and expand the hook portion of the catching member. This makes it possible to engage the catching member with the engageable portion with a relatively small force so as to readily return to the initial state.

In the above vehicle hood structure, the engageable portion may have an extension region extending continuously from the engagement guide region in a direction opposite to the catching-member guiding direction of the engagement guide region.

According to this vehicle hood structure, the extension region can reinforce the engagement guide region to adequately ensure the rigidity of the engagement guide region. This makes it possible to effectively prevent plastic deformation in the engageable portion which is likely to occur when the hook portion of the catching member is engaged and disengaged with and from the engagement guide region, even if the catching member has a width different from that of the engageable portion.

In the above vehicle hood structure, the link member is formed in a sectionally angular C shape having an opening in one side surface thereof, and the extension region of the engageable portion is disposed to cover the opening.

According to this vehicle hood structure, the link member can be effectively reinforced by the extension region of the engageable portion. This makes it possible to adequately ensure the rigidity of the link member without increase in weight of the link member, so as to allow the link member to stably support the rear end of the hood.

Preferably, the above vehicle hood structure may include a hood-side bracket attached to the hood. Further, the link member may be coupled to the hood through the hood-side bracket, and the catching member may have an anchor base portion sandwiched between the hood and the hood-side bracket.

According to this vehicle hood structure, the anchor base portion of the catching member is sandwiched between the hood and the hood-side bracket. This makes it possible to adequately maintain a mounting position of the catching member to the hood so as to effectively prevent the engagement state of the catching member from being undesirably released due to loads acting during the operation of opening and closing the hood.

In the above vehicle hood structure, the catching member may be formed with a locking protrusion. The vehicle hood structure may further include a stopper member located in the vehicle body and adapted to restrict the locking protrusion from being displaced rearward.

According to this vehicle hood structure, when an impact force acting to move the hood rearward is applied to the hood due to a front-impact collision, the locking protrusion located in the hood comes into contact with the stopper member to restrict a rearward movement of the hood so as to prevent the occurrence of an undesirable situation, such as breakage of a front windshield due to the hood, in a simplified structure.

In the above vehicle hood structure, the pivot member may be located at a mounting portion of a hood hinge bracket fixed to the vehicle body, and the stopper member may be disposed on a frontward side of the mounting portion with a given distance therebetween.

According to this vehicle hood structure, a rearward movement of the hood can be restricted at a time when the locking protrusion located in the hood comes into contact with the stopper member due to the rearward movement of the hood caused by an impact force acting to move the hood rearward during a front-impact collision. Then, when the impact load acting to move the hood rearward is increased to a given value or more, the stopper member is pushed by the locking protrusion, and displaced rearward. Thus, the stopper member comes into contact with the mounting portion of the hinge bracket to restrict the hood and the stopper member from being further displaced rearward. In this manner, the impact load can be advantageously absorbed stepwise.

Preferably, the above vehicle hood structure may include a push-up drive device located in the vehicle body and adapted to be driven in a direction allowing the rear end of the hood to be pushed upward.

According to this vehicle hood structure, in the event of a collision between the front end of the vehicle body and an obstacle, the push-up drive device can be activated to bias the rear end of the hood or the like upward so as to separate the lockable member from the guide groove portion. This makes it possible to release a coupled state between the link member and the hood.

In the vehicle hood structure, the restriction mechanism may comprise a guide groove portion formed in either one of the link member and the hood to extend rearward and downward so as to serve as the restricting element, and a lockable member located in the remaining one of the link member and the hood and adapted to be locked by the guide groove portion to serve as a lockable element.

According to this vehicle hood structure, in the event of a collision between the front end of the vehicle body and an obstacle, the lockable member can be moved rearward and downward, or frontward and upward, along the guide groove portion to release a restriction state by restriction means so as to move the rear end of the hood. This makes it possible to sufficiently ensure a downward stroke of the hood, for example, when the above obstacle falls onto the hood, so as to effectively reduce an impact load to be applied to the obstacle. Further, after the occurrence of the impact collision, the rear end of the hood lifted as described above can be pushed downward to displace the lockable member from a non-restriction position to a restriction position. This makes it possible to readily return to the initial state without any complicated operation, such as an operation of coupling the link member and the hood together using a new coupling member.

In the above vehicle hood structure, the guide groove portion may include a guide groove having an opening at one end thereof. The guide groove portion is designed to selectively lock and unlock the lockable member thereinto and therefrom through the open end.

According to this vehicle hood structure, the lockable member can be readily moved between the restriction position and the non-restriction position in the guide groove portion, while preventing an increase in size of the hood-side bracket or the link member which is formed with the guide groove portion.

In the above vehicle hood structure, the guide groove may be formed to have a width which increases toward the open end.

According to this vehicle hood structure, the lockable member can be slidingly displaced to the restriction position of the guide groove portion to stably lock the link member to the hood while preventing a wobbling movement of the lockable member. In addition, when the lockable member is moved from the non-restriction position to the restriction position, the lockable member can be smoothly introduced into the guide groove portion.

In the above vehicle hood structure, the link member may have one end pivotally supported by the vehicle body through a first pivot member, and the other end pivotally supported by the hood through a second pivot member. The restriction mechanism may be designed to restrict the link member from being swingingly displaced about the second pivot member and separated away from the hood.

In the above vehicle hood structure, the pivot member may include a first pivot member pivotally supporting one of opposite ends of the link member relative to the vehicle body, and the hood may include a second pivot member pivotally supporting the other end of the link member. The restriction mechanism may be designed to restrict the link member from being swingingly displaced about the second pivot member and separated away from the hood.

According to this vehicle hood structure, the coupled state between an intermediate portion of the link member and a rear end of the hood-side bracket can be adequately released during an impact collision, and, after release of the coupled state, the intermediate portion of the link member and the rear end of the hood-side bracket can be retuned to the initial state through a simple operation.

In the above vehicle hood structure, the link member may be formed with a guide slot extending frontward and downward, and the second pivot member may include a coupling pin which is located in the hood and slidably supported by the guide slot slidably therealong.

According to this vehicle hood structure, when the rear end of the hood is lifted upward, the second pivot member can be slidingly displaced along the guide slot to smoothly perform an operation of swingingly displacing the hood about a front end thereof so as to move the rear end of the hood upward, and swingingly displacing the link member about the first pivot member so as to move the front end of the link member upward. In addition, when the rear end of the hood is moved downward from the lifted position to the initial position, a movement locus of the lockable member can be stabilized to reliably introduce the lockable member into the guide groove portion.

In the above vehicle hood structure, preferably, either one of the guide groove portion and the lockable member may be located in the hood, and formed with a locking protrusion protruding downward. In this case, the vehicle hood structure may further include a stopper member located in the vehicle body and adapted to restrict the locking protrusion from being displaced rearward.

According to this vehicle hood structure, when an impact force acting to move the hood rearward is applied to the hood due to a front-impact collision, the locking protrusion located in the hood comes into contact with the stopper member to restrict a rearward movement of the hood so as to prevent the occurrence of an undesirable situation, such as breakage of a front windshield due to the hood, in a simplified structure.

In the above vehicle hood structure, the pivot member is located at a mounting portion of a hood hinge bracket fixed to the vehicle body, and the stopper member is disposed on a frontward side of the mounting portion with a given distance therebetween.

According to this vehicle hood structure, a rearward movement of the hood can be restricted at a time when the locking protrusion located in the hood comes into contact with the stopper member 33 due to the rearward movement of the hood caused by an impact force acting to move the hood rearward during a front-impact collision. Then, when the impact load acting to move the hood rearward is increased to a given value or more, the stopper member is pushed by the locking protrusion, and displaced rearward. Thus, the stopper member comes into contact with the mounting portion for the pivot member to restrict the hood and the stopper member from being further displaced rearward. In this manner, the impact load can be advantageously absorbed stepwise.

The above vehicle hood structure may include a push-up drive device located in the vehicle body and adapted to be driven in a direction allowing the rear end of the hood to be pushed upward.

According to this vehicle hood structure, in the event of a collision between the front end of the vehicle body and an obstacle, the push-up drive device can be activated to bias the link member upward, while maintaining the coupled state between the respective front ends of the link member and the hood-side bracket by the second pivot member, so that the catching member can be separated from the engageable portion to release the coupled state between the link member and the hood to release the coupling state between the link member and the hood readily and adequately.

This application is based on patent application Nos. 2005-249175, 2005-249176, 2005-249177, and 2005-249178 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A vehicle hood structure disposed in a front region of a vehicle body and supported in an openable and closable manner, comprising:
    a link member swingably supported in a pivoted manner by a pivot member located on the vehicle body; and
    a restriction mechanism adapted to couple the link member to a rear end of a hood so as to restrict the link member from being separated away from the hood, the restriction mechanism including a restricting element located in either one of the link member and the hood, and a restricted element located in the remaining one of the link member and the hood;
    said restricting element includes a catching member with a locking protrusion, supported by the hood; and
    a stopper member located in the vehicle body and adapted to restrict the locking protrusion from being displaced rearward.

2. The vehicle hood structure as defined in claim 1, wherein:
    the pivot member includes a first pivot member swingably supporting an anchor end of the link member relative to the vehicle body;
    the link member has a front end rotatably supported in a pivoted manner by a second pivot member located on the hood;
    the restricting element including the catching member is supported by the hood in a cantilevered manner; and
    the restricted element includes an engageable portion located in the link member and adapted to be disengageably engaged with the catching member.

3. The vehicle hood structure as defined in claim 2, wherein:
    the caching member has a free end formed as a hook portion; and
    the engageable portion has an engagement guide region for guiding the catching member in a direction allowing the hook portion to be expanded.

4. The vehicle hood structure as defined in claim 3, wherein the engageable portion has an extension region extending continuously from the engagement guide region in a direction opposite to the caching-member guiding direction of the engagement guide region.

5. The vehicle hood structure as defined in claim 4, wherein:
    the link member is formed in a sectionally angular C shape having an opening in one side surface thereof; and
    the extension region of the engageable portion is disposed to cover the opening.

6. The vehicle hood structure as defined in claim 2, which includes a hood-side bracket attached to the hood, wherein:
    the link member is coupled to the hood through the hood-side bracket; and
    the catching member has an anchor base portion sandwiched between the hood and the hood-side bracket.

7. The vehicle hood structure as defined in claim 1, wherein:
    the pivot member is located at a mounting portion of a hood hinge bracket fixed to the vehicle body; and
    the stopper member is disposed on a frontward side of the mounting portion with a given distance therebetween.

8. The vehicle hood structure as defined in claim 7, which includes a push-up drive device located in the vehicle body and adapted to be driven in a direction allowing the rear end of the hood to be pushed upward.

9. A vehicle hood structure disposed in a front region of a vehicle body and supported in an operable and closable manner, comprising:
    a link member swingably supported in a pivoted manner by a pivot member located on the vehicle body; and
    a restriction mechanism adapted to couple the link member to a rear end of a hood so as to restrict the link member from being separated away from the hood,
    wherein the restriction mechanism comprises:
    a restricting element located in either one of the link member and the hood,
    a guide groove portion formed in either one of the link member and the hood to extend rearward and downward so as to serve as the restricting element: and
    a lockable member located in the remaining one of the link member and the hood and adapted to be locked by the guide groove portion to serve as the restricted element;
    wherein either one of the guide groove portion and the lockable member is located in the hood, and formed with a locking protrusion protruding downward, wherein the vehicle hood structure further includes a stopper member located in the vehicle body and adapted to restricted the locking protrusion from being displaced rearward.

10. The vehicle hood structure as defined in claim 9, wherein the guide groove portion includes a guide groove having an opening at one end thereof, the guide groove portion being designed to selectively lock and unlock the lockable member thereinto and therefrom through the open end.

11. The vehicle hood structure as defined in claim 10, wherein the guide groove is formed to have a width which increases toward the open end.

12. The vehicle hood structure as defined in claim 9, wherein:
    the pivot member includes a first pivot member pivotally supporting one of opposite ends of the link member relative to the vehicle body; and
    the hood includes a second pivot member pivotally supporting the other end of the link member,
    wherein the restriction mechanism is designed to restrict the link member from being swingingly displaced about the second pivot member and separated away from the hood.

13. The vehicle hood structure as defined in claim 12, wherein:
    the link member is formed with a guide slot extending frontward and downward; and
    the second pivot member includes a coupling pin which is located in the hood and slidably supported by the guide slot slidably therealong.

14. The vehicle hood structure as defined in claim 9, wherein:
    the pivot member is located at a mounting portion of a hood hinge bracket fixed to the vehicle body; and
    the stopper member is disposed on a frontward side of the mounting portion with a given distance therebetween.

15. The vehicle hood structure as defined in claim 14, which includes a push-up drive device located in the vehicle body and adapted to be driven in a direction allowing the rear end of the hood to be pushed upward.

* * * * *